United States Patent
Yamamoto et al.

(10) Patent No.: US 9,755,439 B2
(45) Date of Patent: Sep. 5, 2017

(54) BATTERY STATE CONTROL CIRCUIT, BATTERY STATE CONTROL DEVICE, AND BATTERY PACK

(71) Applicants: Norifumi Yamamoto, Kanagawa (JP); Akira Nakamura, Chiba (JP)

(72) Inventors: Norifumi Yamamoto, Kanagawa (JP); Akira Nakamura, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 170 days.

(21) Appl. No.: 14/621,484

(22) Filed: Feb. 13, 2015

(65) Prior Publication Data
US 2015/0236533 A1    Aug. 20, 2015

(30) Foreign Application Priority Data

Feb. 14, 2014 (JP) .................. 2014-026709

(51) Int. Cl.
H02J 7/00 (2006.01)
H02J 7/02 (2016.01)

(52) U.S. Cl.
CPC .......... H02J 7/0013 (2013.01); H02J 7/0052 (2013.01); H02J 7/025 (2013.01)

(58) Field of Classification Search
USPC ...................................... 320/108
See application file for complete search history.

(56) References Cited

U.S. PATENT DOCUMENTS

| | | | |
|---|---|---|---|
| 4,376,263 A | * | 3/1983 | Pittroff .............. H02J 7/008 320/140 |
| 8,164,305 B2 | | 4/2012 | Zhang et al. |
| 2001/0020802 A1 | * | 9/2001 | Kitagawa .......... H02J 7/0068 307/66 |
| 2008/0272735 A1 | | 11/2008 | Roessler |
| 2009/0140693 A1 | | 6/2009 | Johnson, Jr. |
| 2009/0230917 A1 | * | 9/2009 | Kojima .......... B60L 11/1851 320/101 |

(Continued)

FOREIGN PATENT DOCUMENTS

EP    0432639 A2    6/1991
JP    H11-176483    7/1999

(Continued)

OTHER PUBLICATIONS

European search report dated Jul. 1, 2015 in corresponding European Patent Application No. 15155099.3.

(Continued)

*Primary Examiner* — Samuel Berhanu
(74) *Attorney, Agent, or Firm* — Cooper & Dunham LLP

(57) ABSTRACT

A battery state control circuit is provided for connection to multiple rechargeable batteries, the multiple batteries being connected in series, for connection to a primary coil connected in series to the multiple batteries, and for connection to multiple secondary coils to which electrical energy stored in the primary coil is transferred, the multiple secondary coils being connected in parallel to the multiple batteries, respectively. The battery state control circuit includes an adjustment unit to adjust the energy amount stored in the primary coil, in accordance with a state of at least one of the multiple batteries.

12 Claims, 10 Drawing Sheets

(56) References Cited

U.S. PATENT DOCUMENTS

| | | |
|---|---|---|
| 2010/0148726 A1 | 6/2010 | Lee et al. |
| 2010/0295509 A1* | 11/2010 | Moussaoui .......... H02J 7/0016 320/118 |
| 2011/0074352 A1* | 3/2011 | Huynh .............. H02M 3/33523 320/111 |
| 2011/0187313 A1* | 8/2011 | Lee .......................... H02J 7/04 320/107 |
| 2012/0153961 A1 | 6/2012 | Kobayashi |
| 2012/0306451 A1 | 12/2012 | Arai |
| 2013/0076310 A1* | 3/2013 | Garnier ................ H02J 7/0016 320/118 |
| 2013/0241471 A1 | 9/2013 | Arai et al. |

FOREIGN PATENT DOCUMENTS

| | | |
|---|---|---|
| JP | 2011-083182 | 4/2011 |
| JP | 2011-182484 | 9/2011 |
| JP | 2013-192394 | 9/2013 |
| WO | WO2008/097031 A1 | 8/2008 |

OTHER PUBLICATIONS

U.S. Appl. No. 14/522,704, filed Oct. 24, 2014.
Jan. 26, 2017 office action in connection with commonly-owned U.S. Appl. No. 14/522,704.

* cited by examiner

US 9,755,439 B2

BATTERY STATE CONTROL CIRCUIT, BATTERY STATE CONTROL DEVICE, AND BATTERY PACK

BACKGROUND

1. Field

The present disclosure relates to a battery state control circuit including multiple rechargeable batteries, a battery state control device, and a battery pack.

2. Description of the Related Art

Conventionally, a battery pack in which multiple secondary batteries (cells) are connected in series is known, and the battery pack includes an electric circuit adapted to adjust battery voltages of the secondary batteries to ensure a uniform battery voltage for the secondary batteries.

In the battery pack according to the related art, the voltages of the secondary batteries are equalized by the electric circuit so as to ensure a uniform battery voltage, which can prevent characteristic differences between the secondary batteries due to manufacturing variations of the secondary batteries and due to cycle degradation or individual changes over time.

For example, JP 2011-182484-A discloses a secondary battery protection circuit including multiple switches connected in parallel to a plurality of secondary batteries, respectively. When the secondary batteries are being charged, the secondary battery protection circuit supplies energy to a secondary battery whose battery voltage is lower a predetermined return voltage.

In another example of JP 2011-083182-A, in a battery circuit including a switch connected to multiple secondary battery cells, electrical energy is transferred from at least one of the battery cells having a higher battery voltage to another of the battery cells having a lower battery voltage.

However, equalizing the battery voltages of the secondary batteries in accordance with the situation is not taken into account in the battery pack according to the above-described related art cases.

SUMMARY

In one aspect, the present disclosure proposes a battery state control circuit which ensures uniform battery voltage for the multiple secondary batteries, in accordance with the using situation.

In an embodiment which solves or reduces one or more of the above-mentioned problems, the present disclosure provides a battery state control circuit provided for connection to multiple rechargeable batteries, the multiple batteries being connected in series, for connection to a primary coil connected in series to the multiple batteries, and for connection to multiple secondary coils to which electrical energy stored in the primary coil is transferred, the multiple secondary coils being connected in parallel to the multiple batteries, respectively. The battery state control circuit includes an adjustment unit to adjust the energy amount stored in the primary coil, in accordance with a state of at least one of the multiple batteries.

Another illustrative embodiment of the present disclosure provides a battery state control device that includes a transformer, connected to the multiple rechargeable batteries, including the primary coil and the multiple secondary coils, and the above-described battery state control circuit.

Yet another illustrative embodiment of the present disclosure provides a battery pack that includes a battery assembly having multiple rechargeable batteries, the multiple batteries being connected in series, the transformer, and the battery state control circuit.

BRIEF DESCRIPTION OF THE DRAWINGS

A more complete appreciation of the disclosure and many of the attendant advantages thereof may be readily obtained as they become better understood by reference to the following detained description when considered in connection with the accompanying drawings, wherein.

DETAILED DESCRIPTION OF THE PREFERRED EMBODIMENTS

A description will be given of embodiments with reference to the accompanying drawings.

[First Embodiment]

Figure 1:
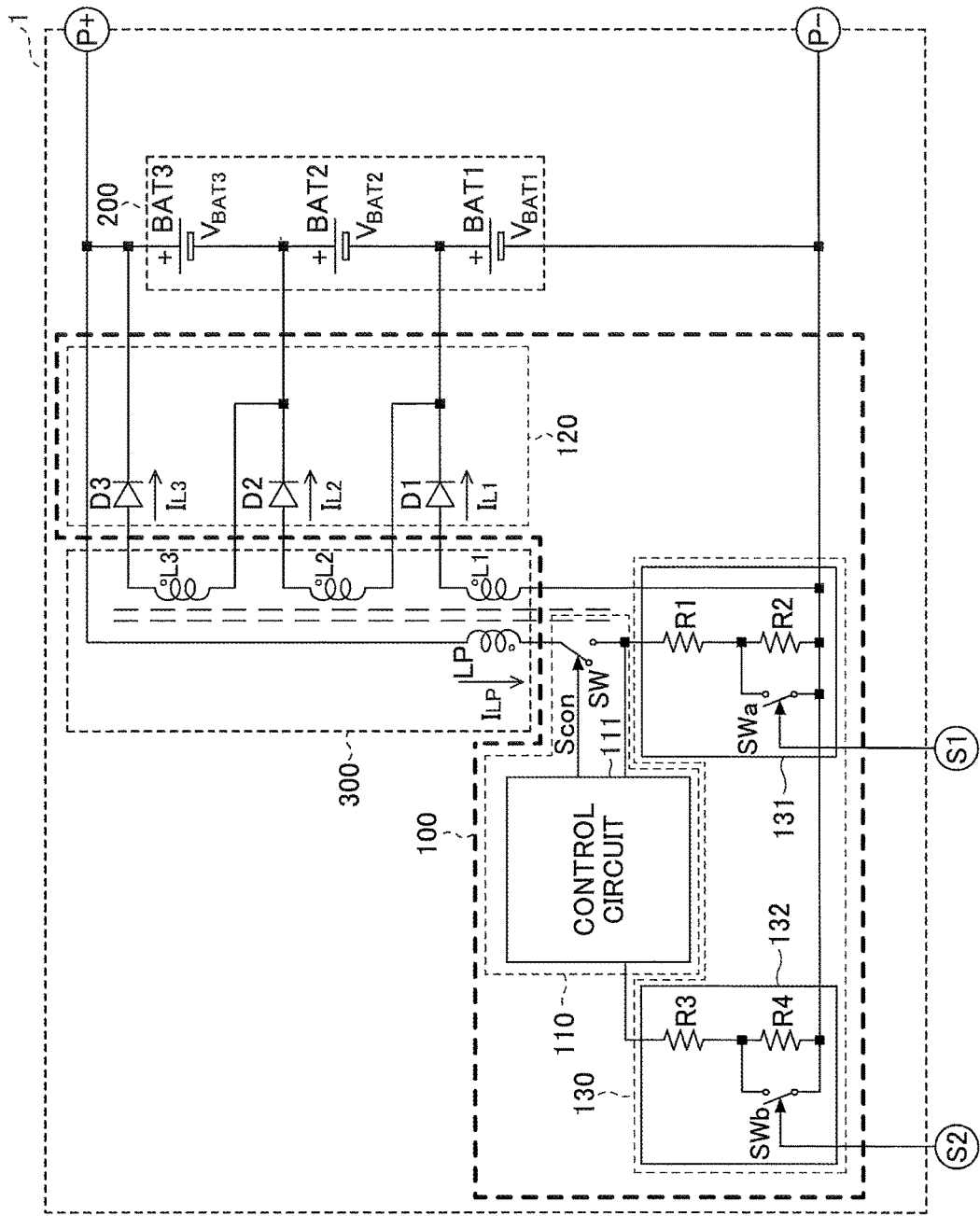
FIG. 1 is a schematic illustrating a battery pack according to a first embodiment.

FIG. 1 shows a battery pack 1 according to a first embodiment. As shown in FIG. 1, the battery pack 1 includes a flyback transformer 300, a terminal P+, a terminal P−, a battery state control circuit (cell balancing circuit) 100, and a battery assembly b 200.

The battery state control circuit 100 is adapted to provide uniform battery voltage for multiple secondary batteries included in the battery assembly 200 and adjust a battery state (energy storage state) of each secondary battery.

The battery state control circuit 100 includes a primary-side driving unit 110, a secondary-side distribution/release unit 120, and an adjustment unit 130.

The primary-side driving unit 110, including a control circuit 111 and a drive switching element SW, functions as a primary-side energy storage unit. For example, the drive switching element SW may be constituted by semiconductor switching elements, such as MOSFETs (metal oxide semiconductor field-effect transistors). The secondary-side distribution/release unit 120, including diodes D1, D2, and D3, releases power (energy) to the respective batteries to distribute (re-distribute) the power to the respective batteries. The adjustment unit 130 includes a current controller (current adjustment circuit) 131 and a frequency controller (frequency adjustment circuit) 132.

In the battery pack 1, the battery assembly 200, connected to the battery state control circuit 100, includes multiple (N number of) rechargeable secondary batteries (battery cell, power storage battery, battery member) BAT1 though BATn. As one example of the present embodiment, three secondary batteries BAT1, BAT2, and BAT3 are provided.

In the flyback transformer 300, a primary coil (primary-side coil) LP functions as a primary-side inductor, and secondary coils (secondary-side coils) L1, L2, and L3 function as secondary-side inductors.

The battery state control circuit 100 constitutes a flyback converter circuit. Electric energy of a positive electrode of the battery assembly 200 is supplied to the primary-side driving unit 110, and the control circuit 111 controls the drive switching element SW. Thus, the energy set by the current controller (primary-side resistor group) 131 and the control circuit 111 is stored in the primary coil LP, in a period (ON period) during which the drive switching element SW is in an ON state.

Since the primary coil (primary-side coil) LP is connected to the positive electrode of the battery assembly 200, the energy is supplied from both a charger (not shown) and the entirety of battery assembly 200 during charging in a state in which a charger is connected. When the drive switching element SW is turned OFF, the energy from the charger and the battery assembly 200 supplied to the primary coil LP is output (re-distributed) to the secondary coils L1, L2, and L3 and then the secondary coils L1, L2, and L3 supply the energy distributed from the charger and the battery voltages, to a secondary battery that has a lower battery voltage.

Further, the primary coil LP receives the energy supplied from the entirety of the battery assembly 200 during discharging in a state in which a load is connected. The energy from battery assembly 200 supplied to the primary coil LP is re-distributed to the secondary coils (secondary-side coils) L1 through L3 in a period (OFF period) during which the drive switching element SW is in an OFF state, and the secondary coils L1, L2, and L3 supply the energy, distributed from and the battery voltages, to the secondary battery that has a low battery voltage.

The secondary-side distribution/release unit 120 functions as an energy release unit and energy distribution unit. The energy stored in the primary coil LP is released (supplied) to the secondary batteries BAT1, BAT2, and BAT3 via the diodes D1, D2, and D3, respectively.

The flyback transformer 300 of the present embodiment stores the energy in the ON period during which the drive switching element SW is an ON state. Then, when the drive switching element SW is turned off, using counter electromotive force of the primary coil LP, the primary coil LP outputs the stored energy to the secondary coils L1, L2, and L3 at the same time.

In the present embodiment, an apparatus including the battery state control circuit 100 and the flyback transformer 300 is called a battery state control device. The terminal P+ of the battery pack 1 is connected to the charger or a positive terminal of the load, and the terminal P− is connected to the charger or a negative terminal of the load.

In the battery assembly 200, the secondary batteries BAT1, BAT2, and BAT3 are connected in series, and a cathode of the secondary battery BAT3 is connected to the terminal P+ and an anode of the secondary battery BAT1 is connected to the terminal P−.

The cathode of the secondary battery BAT3 in the battery assembly 200 is connected to one end of the primary coil LP, and the other end of the primary coil LP is connected to one end of the drive switching element SW. The other end of the drive switching element SW is connected to the anode of the secondary battery BAT1 via the current controller 131.

One end of the secondary coil L1 is connected to the anode of the secondary battery BAT1, and the other end of the secondary coil L1 is connected to a cathode of the secondary battery BAT1 via the diode D1. One end of the diode D1 is connected to the other end of the secondary coil L1, and the other end of the diode D1 is connected to the cathode of the secondary battery BAT1.

One end of the secondary coil L2 is connected to the cathode of the secondary battery BAT1 and an anode of the secondary battery BAT2, and the other end of the secondary coil L2 is connected to a cathode of the secondary battery BAT2 via the diode D2. One end of the diode D2 is connected to the other end of the secondary coil L2, and the other end of the diode D2 is connected to the cathode of the secondary battery BAT2.

One end of the secondary coil L3 is connected to the cathode of the secondary battery BAT2 and an anode of the secondary battery BAT3, and the other end of the secondary coil L3 is connected to the cathode of the secondary battery BAT3 and the terminal P+ via the diode D3. One end of the diode D3 is connected to the other end of the secondary coil L3, and the other end of the diode D3 is connected to the cathode of the secondary battery BAT3.

The control circuit 111 of the present embodiment generates and outputs a switching element control signal (pulse signal) Scon that controls switching ON/OFF the drive switching element SW. Specifically, the switching element control signal Scon is, for example, a rectangular signal that turns the drive switching element SW ON at a predetermined timing.

Herein, the current controller 131 includes resistors R1 and R2, and a switching element SWa. In the current controller 131, one end of the resistor R1 is connected to the control circuit 111 and the drive switching element SW. One end of the resistor R2 is connected to the other end of the resistor R1, and the other end of the resistor R2 is connected to the terminal P−. The switching element SWa is connected in parallel to the resistor R2, and a signal Si that controls switching ON/OFF the switching element SWa can be input to a gate terminal of the switching element SWa.

The current controller 131 of the present embodiment has a function to adjust a current value to be selectively supplied to the secondary coils L1, L2, and L3 via the primary coil LP, which is described in further detail later.

Further, the frequency controller 132 includes resistors R3, R4 and a switching element SWb. In the frequency controller 132, one end of the resistor R3 is connected to the control circuit 111. One end of the resistor R4 is connected to the other end of the resistor R3 and the other end of the resistor R4 is connected to the terminal P−. The switching element SWb is connected in parallel to the resistor R4, and a signal S2 that controls switching ON/OFF the switching element SWb can be input to a gate terminal of the switching element SWb.

The frequency controller 132 of the present embodiment has a function to adjust a switching frequency used for adjusting timing (cycle) of the energy supplied to the secondary coils L1, L2, and L3 via the primary coil LP, which is described in further detail later.

(Operational Mode)

Herein, the operational mode of the present embodiment is described below. In the operation of the battery state control circuit 100 having the above-described configuration, the example in which the battery assembly 200 includes three secondary batteries BAT1, BAT2, and BAT3 is described. In this example, the battery voltages of the respective secondary batteries are set with the voltage difference so that the battery voltages decreased in the order $V_{BAT1}$, $V_{BAT2}$, and $V_{BAT3}$ (battery voltage $V_{BAT1}$ of the secondary battery BAT1>the battery voltage $V_{BAT2}$ of the secondary battery BAT2>the battery voltage $V_{BAT3}$ of the secondary battery BAT3).

Figure 2B:
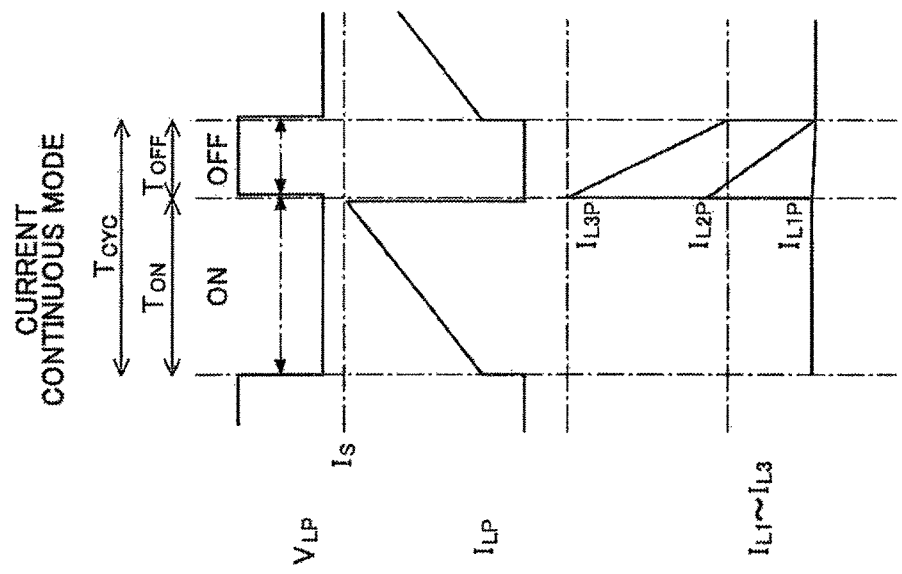
FIG. 2B is a graph showing current waveforms of respective coils of the battery pack in a current continuous mode.
Figure 2A:
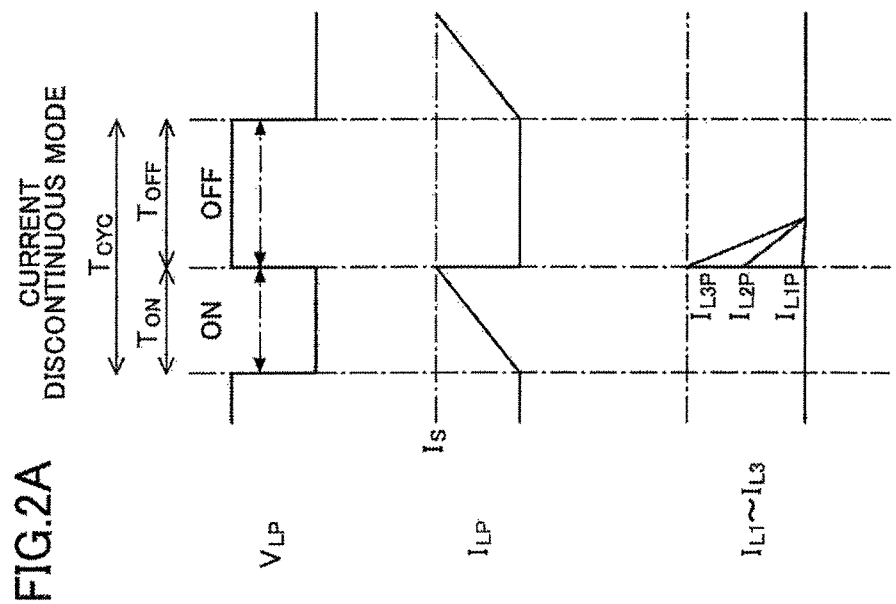
FIG. 2A is a graph showing current waveforms of respective coils of the battery pack in a current discontinuous mode.

FIGS. 2A and 2B show the waveforms of the respective coils in a current continuous mode and a current discontinuous mode.

In FIGS. 2A and 2B, $V_{LP}$ denotes a primary voltage of the primary coil LP, $I_{LP}$ denotes a primary inductor current flowing to the primary coil LP, and $I_{L1}$ through $I_{L3}$ denote secondary inductor currents flowing to respective the secondary coils L1 through L3. FIGS. 2A and 2B show the changes in the primary voltage $V_{LP}$, the primary inductor current $I_{LP}$, and the secondary inductor currents $I_{L1}$ through $I_{L3}$, in accordance with switching ON/OFF the drive switching element SW.

FIG. 2A shows the waveform in the current discontinuous mode in which the current value of the primary inductor current $I_{LP}$ is relatively small. FIG. 2B shows the waveform in the continuous mode in which the current value of the primary inductor current $I_{LP}$ is relatively large.

Herein, the primary voltage $V_{LP}$ corresponds to a voltage of the drive switching element SW. The voltage $V_{LP}$ is set to be a low value while the current flows to the primary coil LP and the energy is stored in the primary coil LP, and the voltage $V_{LP}$ is set to be a high value while the current does not flow to the primary coil LP and the primary coil LP releases the energy.

By adjusting the resistance value of the current controller 131, the battery state control circuit 100 of the present embodiment can control a value of the primary inductor current $I_{LP}$, to switch the operational mode between the current continuous mode and the current discontinuous mode. By adjusting the resistance value of the frequency controller 132, the battery state control circuit 100 of the present embodiment can control a cycle where the drive switching element SW is turned ON and OFF, to switch the operational mode between the current continuous mode and the current discontinuous mode.

The discontinuous mode of the present embodiment is the operational mode where, during the ON period of the drive switching element SW, a period in which the inductor current $I_{LP}$ flowing to the primary coil LP is 0 exists. The continuous mode of the present embodiment is the operational mode that, during the ON period of the drive switching element SW, a period in which the inductor current $I_{LP}$ flowing to the primary coil LP is 0 does not exist.

The flyback transformer 300 of the present embodiment stores the energy (primary side electric power) $W_1$ (see the formula 1) during the ON period of the drive switching element SW. When the drive switching element SW is turned off, the stored energy is output (released) at once to the secondary coils L1 through L3 using the counter electromotive force.

In the current discontinuous mode of FIG. 2A, when the drive switching element SW in the battery pack 1 shown in FIG. 1 is turned on, the inductor current $I_{LP}$ is generated in the primary coil L. When the inductor current $I_{LP}$ is increased to a threshold current Is, set by the resistance value of the current controller 131 and the control circuit 111, the drive switching element SW is turned off. During this time, the primary-side electrical power $W_1$ is stored in the primary coil LP. The electrical power $W_1$ at this time is represented by the following formula (1) where Lp denotes a self-inductance of the primary coil LP.

$$W_1 = \frac{1}{2} L_P I_S^2 \qquad (1)$$

In the battery state control circuit 110, when the drive switching element SW is turned OFF, a magnetic flux φB is produced instantaneously and a counter (induced) electromotive force E is generated in each of the coils L1, L2, L3. The counter electromotive force E is represented by the following formula (2) where $N_2$ denotes the number of coil turns of the secondary coils corresponding L1, L2, L3.

$$E = N_2 \frac{-d\phi_B}{dt} \qquad (2)$$

As is shown in FIG. 1, the number of outputs of the secondary-side distribution/release unit 120 is three that is equal to the number of the secondary coils L1, L2, and L3. In addition, it is assumed that the number of turns of each of the coils L1, L2, L3 in this embodiment is the same number. Hence, the counter (induced) electromotive force (inductor voltage) E generated in each of the coils L1, L2, L3 is the same.

When the inductor voltage $V_E$ is increased and then becomes greater than the corresponding battery voltages of the secondary batteries, the current is released via the diodes. That is, the secondary batteries are configured to be selectively charged in increasing order of the battery voltages.

Representing the currents released from the secondary coils L1, L2, and L3 and then used to recharged any one of the secondary batteries BAT1 though BAT3 as $I_{L1}$, $I_{L2}$, and $I_{L3}$, peak currents as $I_{L1P}$, $I_{L2P}$, and $I_{L3P}$, and self-inductances of the secondary coils L1, L2, and L3 as $L_1$, $L_2$, and $L_3$, the currents are released as shown in FIG. 2A in accordance with the three secondary batteries BAT1, BAT2, and BAT3. Power $W_2$ released from the secondary coils L1, L2, and L3 can be calculated by the following formula (3).

$$W_2 = \frac{1}{2} L_1 I_{L1P}^2 + \frac{1}{2} L_2 I_{L2P}^2 + \frac{1}{2} L_3 I_{L3P}^2 \qquad (3)$$

Assuming that there is no power loss in entirety of the diodes D1, D2, D3, and the flyback transformer 300, a relation representing the formula "the power stored in the primary coil LP is equivalent to the power $W_2$ released from the secondary coils L1, L2, and L3" is obtained.

It is known that, a forward direction voltage VD of the diode can be obtained by the following formula (4) using a forward direction current $I_D$ of the diode.

$$V_D = \frac{nkT}{q} \log_e \frac{I_D}{I_0} \qquad (4)$$

where, q=1.6×10$^{-19}$ (coulomb): Charge of electron
k=8.6×10$^{-5}$ (eV/K): Boltzmann Constant
Io (A): Saturation Current
n: Ideality Factor (n=1–2)
T (K): Absolute Temperature Under the condition of the battery assembly 200 at which battery voltage $V_{BAT1}$ of the secondary battery BAT1>the battery voltage $V_{BAT2}$ of the secondary battery BAT2>the battery voltage $V_{BAT3}$ of the secondary battery BAT3, the following formula (5) holds for the respective battery voltages.

$$I_D \approx I_0 \left[ \exp\left(\frac{qV(E-V_{BAT})}{nkT}\right) \right] \quad (5)$$

Therefore, a large amount of the current $I_D$ ($=I_{Ln}$) selectively flows through the secondary battery that has lower voltage. At this time, assuming that the self-inductances $L_1$, $L_2$, and $L_3$ of the secondary coils L1, L2, and L3 are set to as $L_1=L_2=L_3=L_s$ based on the formulas (1) and (3), the currents $I_{L1}$, $I_{L2}$, and $I_{L3}$ flowing through the secondary batteries in the current discontinuous mode shown in FIG. 2A can be calculated by the following formula (6).

$$L_P I_S^2 = L_s(I_{L1P}^2 + I_{L2P}^2 + I_{L3P}^2) \quad (6)$$

When the voltage differences among the battery voltages of the secondary batteries are great, the energy is used to charge only the secondary battery BAT3 that is the lowest battery voltage, and the relation representing the following formula (7) is obtained based on the formula (6).

$$\frac{1}{2} L_P I_S^2 = \frac{1}{2} L_3 I_{L3P}^2 \quad (7)$$

Assuming that ratio of the number of coil turns of the primary coil LP to the secondary coil L3 ($L_1=L_2=L_3$) is set to a ratio of $N_P$ to 1, the following formula (8) holds:

$$I_{L3P} = N_P I_S \quad (8)$$

The threshold current Is set at the primary-side driving unit 110 and the primary-side power $W_1$ stored in the primary coil LP can be supplied to the secondary battery BAT3 as a triangular wave that has a peak current $I_{LnP}$ represented in FIG. 2A.

As described above, in the battery state control circuit 100 and the flyback transformer 300, the current is released to the secondary battery BAT 1 though BAT3 side. After one cycle set in the control circuit 111 has elapsed, the next cycle is started.

Herein, a process (energy transfer process) of storing and releasing the energy between a primary side (the primary-side driving unit 110 and the primary coil LP) and a secondary side (the secondary coils L1 through L3 and the secondary-side distribution/release unit 120) is set as one cycle, in the battery state control circuit 100 and the flyback transformer 300.

The battery state control circuit 100 obtains the energy from the entirety of the battery assembly 200 and transfers the energy to at least one of the secondary battery BAT1 through BAT3 that has relatively lower battery voltage. By repeating the cycle, without monitoring the individual battery voltage, the battery voltages of the secondary batteries BAT1 though VAT3 can be equalized.

<<Control in Current Controller>>

The current controller 131 controls a current value (a threshold current Is) of the inductor current $I_{LP}$ flowing to the primary coil LP. With this configuration, a duty ratio ($T_{ON}/T_{CYC}$: $T_{CYC}=T_{ON}+T_{OFF}$) that is an ON period $T_{ON}$ of the drive switching element SW is changed relative to the switching cycle $T_{CYC}$, and the operation mode can be switched.

The control circuit 111, constituted by, for example, an output transistor, generates a (rectangular) pulse signal Scon that is a switching control signal to switch ON/OFF the drive switching element SW.

Specifically, when the inductor current $I_{LP}$ reaches (increased to) the threshold current Is set by the current controller 131 and the control circuit 111, the control circuit 111 turns the rectangular pulse signal Scon to low level (L) to switch the drive switching element SW OFF. Further, the control circuit 111 turns the rectangular pulse signal Scon to high level (H) to switch the drive switching element SW ON in a predetermined cycle.

In the present embodiment, in a case where the operational mode of the flyback transformer 300 is set to be the discontinuous mode, the power $W_1$ stored in the primary coil LP is decreased to such a degree that all the power $W_1$ is released during the OFF period of the drive switching element SW. In order to meet the condition, the inductor current $I_{LP}$ flowing to the primary coil LP during the ON period of the drive switching element SW can be set small.

Herein, as the resistance value of the current controller 131 is changed, the inductor current $I_{LP}$ flowing to the primary coil LP is changed. For example, when the resistance value is increased ten times, the inductor current $I_{LP}$ is decreased to one-tenth of the original value, the power stored in the primary coil LP is decreased to one-hundredth that is calculated by using "$W_1=1/2L_P I_S^2$" of the formula (1). The power $W_1$ stored in the primary coil LP is determined based on the self-inductance value $L_P$ and the threshold current Is.

Specifically, while the switching element SWa is OFF, the resistor R2 is connected to the resistor R1, so the resistance value of the current controller 131 is set to a combined resistance of the resistance values of the resistors R1 and R2 (Resistance value: Large).

With this condition, as the threshold current Is is set to a small value, the inductor current $I_{LP}$ of the primary coil LP is increased to the threshold current Is in a short time, and the ON period of the drive switching element SW becomes shorter within 1 cycle of the pulse signal Son. Accordingly, the operational mode of the flyback transformer 300 is more likely to be the discontinuous mode for releasing all the power $W_1$ stored in the primary coil LP during the OFF period of the drive switching element SW.

To the contrary, in a case where the operational mode of the flyback transformer 300 is set to be the continuous mode, the power $W_1$ stored in the primary coil LP is decreased to such a degree that not all the power $W_1$ is released during the OFF period of the drive switching element SW. In order to meet the condition, the inductor current $I_{LP}$ supplied to the primary coil LP during ON period of the drive switching element SW can be set great.

Specifically, while the switching element SWa is ON, the resistor R2 that is connected to the terminal P− is short-circuited by the switching element SWa, so the resistance value of the current controller 131 of the present embodiment, that is, the resistance value between the primary coil LP and the terminal P− becomes small by the value corresponding to the resistor R1 (Resistance value: Small).

With this condition, as the threshold current Is is set to a large value, the value of the inductor current $I_{LP}$ flowing to the primary coil LP becomes greater, and the power $W_1$ stored in the primary coil LP becomes greater. Accordingly, the operational mode of the flyback transformer 300 is more likely to be the continuous mode for switching the drive switching element SW ON before all of the power $W_1$ stored in the primary coil LP is released during the OFF-period of the drive switching element SW.

As described above, the current controller 131 of the present embodiment adjusts the threshold current Is to adjust the length of the storage period during which the energy is stored in the primary coil LP relative to a predetermined cycle of storing and releasing the energy. Accordingly, the amount of the current (energy amount) supplied to the primary coil LP can be adjusted.

It is to be noted that, the threshold current Is of the present embodiment may be set by the control circuit 111 in accordance with a signal S1. Further, as one example, when the switching element SW is constituted by a transistor, the threshold current Is of the present embodiment may be determined based on a specified value of the transistor and the resistance value of the current controller 131.

<<Control in Frequency Controller>>

The frequency controller 132 adjusts the frequency of the pulse signal Scon that controls the inductor current $I_{LP}$ flowing to the primary coil LP to change a period of 1 cycle and change a start timing of a subsequent ON period of the cycle, for changing the duty ratio and the operational mode can be changed.

In a case where the operational mode is set to be the discontinuous mode, in order to release all of the power energy $W_1$ stored in the primary coil in the OFF period of the drive switching element SW, the OFF period in switching of the drive switching element SW is set to be longer. Therefore, the frequency controller 132 of the present embodiment sets the switching frequency to be lower so that the OFF period of the drive switching element SW may become longer. Herein, as the resistance value of the frequency controller 132 is changed, the period of 1 cycle of the pulse signal Scon is changed.

For example, while the switching element SWb is OFF, the resistor R4 is connected to the resistor R3, so the resistance value of the frequency controller 132 is set to a combined resistance of the resistance values of the resistors R3 and R4 (Resistance value: Large).

When the resistance value of the frequency controller 132 is increased, the frequency of the pulse signal Scon becomes lower, so the switching cycle $T_{CYC}$ of the pulse signal Scon becomes longer. Thus, the OFF period of the drive switching element SW from when the drive switching element SW is turned off to when the drive switching element SW is turned ON again becomes longer. Accordingly, the battery state control circuit 100 is more likely to enter the discontinuous mode for releasing all the power $W_1$ stored in the primary coil LP during the OFF period.

To the contrary, in a case where the operational mode is set to be the continuous mode, in order not to release all of the power $W_1$ stored in the primary coil LP during the OFF period of the drive switching element SW, the switching frequency is set to be higher and the OFF period $T_{OFF}$ of the drive switching element is set to be shorter.

For example, in the frequency controller 132, while the switching element SWb is ON, the resistor R4 connected to the terminal P- is short-circuited by the switching element SWb. In this situation, the resistance value of the frequency controller 132 becomes equivalent to the resistance value of the resistor R3 (Resistance value: Small).

When the resistance value of the frequency controller 132 is decreased (small), the frequency of the pulse signal Scon becomes higher, and the switching cycle $T_{CYC}$ of the pulse signal Scon becomes shorter. Thus, the OFF period of the drive switching element SW from when the drive switching element SW is turned off to when the drive switching element SW is turned ON again becomes shorter. Accordingly, the battery state control circuit 100 is more likely to enter the continuous mode.

With this configuration, in a state during which the switching element SWb is ON state when the signal S2 is input, the operational mode of the flyback transformer 300 is set to be the continuous mode. The battery voltages of the respective secondary batteries BAT1 through BAT3 can be equalized, in accordance with the speed of the battery voltage fluctuations, that is, in accordance with a gap of the battery voltage changes generated among the secondary batteries due to difference of the voltage changing speed.

By contrast, in a state during which the switching element SWb is OFF state when the signal S2 is not input, the operational mode of the flyback transformer 300 is set to be the continuous mode, thereby enabling the inductor current $I_{LP}$ to be smaller and enabling reducing the current consumption for the operation in the battery state control circuit 100.

In short, by adjusting the frequency (switching frequency) of the drive switching element SW, the frequency controller 132 adjusts the length of a cycle of storing and releasing the energy, relative to a predetermined storage period during which the energy is stored in the primary coil LP. Thus, the frequency controller 132 can execute a function to adjust the energy with which the primary coil LP is supplied.

It is to be noted that, depending on the input of the signal S1 and/or S2, the resistance values may be set to be smaller by using both the current control circuit 131 and the frequency control circuit 132; alternately, by using either the current control circuit 131 or the frequency control circuit 132.

As described above, by controlling the current controller 131 and/or the frequency controller 132, the operational mode can be switched between the continuous mode and the discontinuous mode. Thus, the battery voltages of the respective secondary batteries BAT1 through BAT3 can be equalized, in accordance with the speed of the battery voltage fluctuations due to charging and discharging.

In the continuous mode, the inductor current $I_{LP}$ flowing to the primary coil LP is great, thereby inevitably causing the current values flowing to the secondary coils L1, L2, and L3 to be greater. Thus, the battery state control circuit 100 can charge the secondary battery that has the lowest voltage in a shorter time in the continuous mode than that in the discontinuous mode, thereby enabling the respective battery voltages to be equalized.

In the present embodiment, it is preferable that the continuous mode and the discontinuous mode be selected, depending on the purpose of use.

Setting the operational mode to be in the discontinuous mode can prevent the battery state control circuit 100 from working as a load, thereby reducing the power consumption.

In the present embodiment, the value of the inductor current $I_{LP}$ may be adjusted in the middle of the continuous mode and/or in the middle of the discontinuous mode. The switching frequency that defines the cycle $T_{CYC}$ of the pulse signal Scon to control switching ON/OFF the drive switching element SW may be adjusted in the middle of the continuous mode and/or in the middle of the discontinuous mode.

[Second Embodiment]

Figure 3:
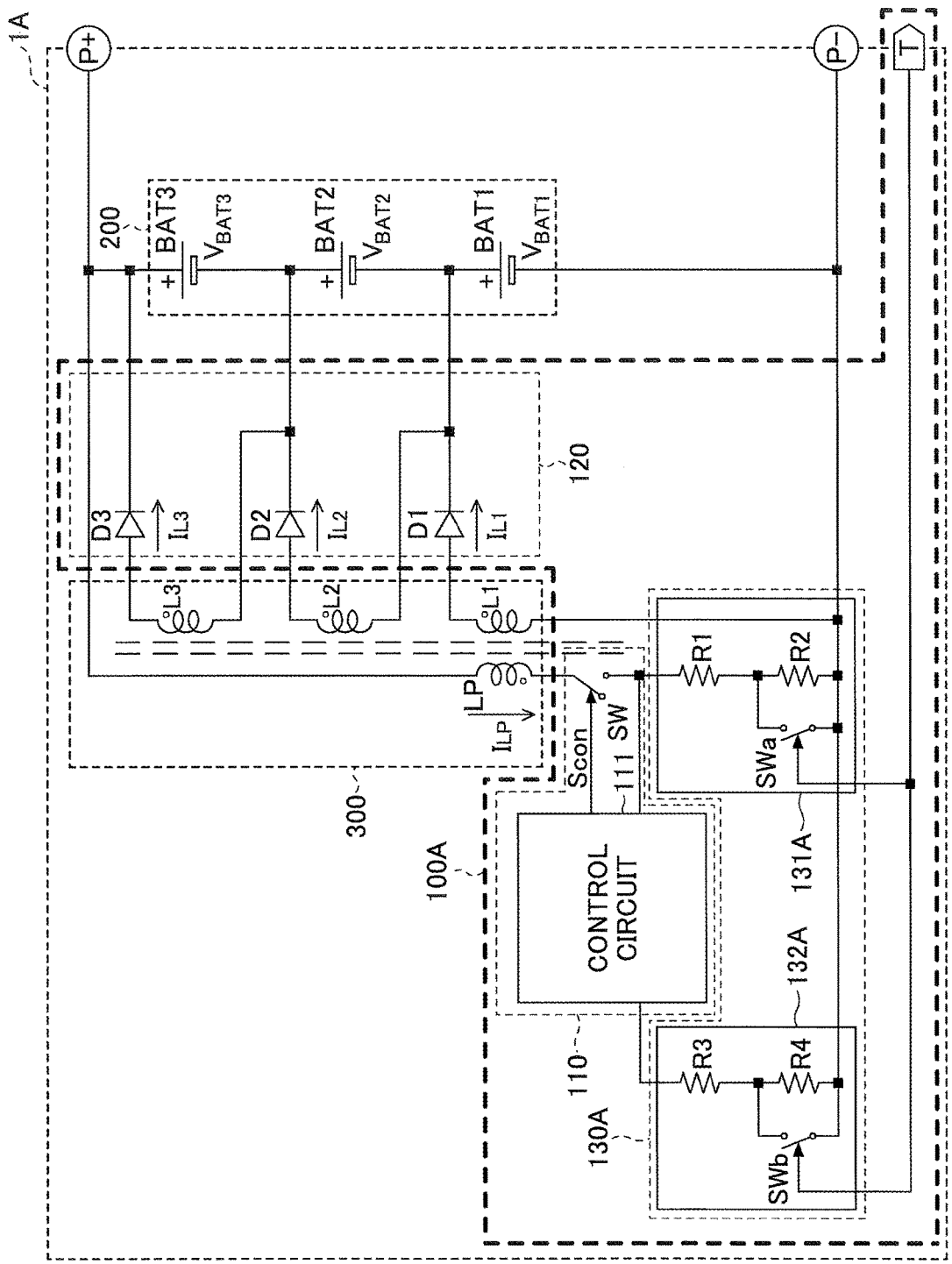
FIG. 3 is a schematic illustrating a battery pack according to a second embodiment.

FIG. 3 shows a battery pack 1A according to a second embodiment. Herein, the second embodiment uses a thermistor, for an actual controllable device to which the method of the above-described first embodiment is applicable. In the second embodiment shown in FIG. 3, the switching element SWa of a current controller 131A and the switching element SWb of a frequency controller 132A are connected to a thermistor terminal T.

It is to be noted that, for ease of explanation and illustration, because other than the difference described above the battery pack 1A has a configuration similar to the configuration of the battery pack 1 in the first embodiment, other components of the battery pack 1A are represented by identical numerals and the description thereof is omitted below.

<To Detect Connection of Charger at Thermistor Terminal>

The battery pack 1A according to the present embodiment includes a charger connection detection terminal T to detect that a charger is connected. The charger connection detection terminal T is provided for detecting the charger connected to the battery pack 1A including the secondary batteries BAT1 through BAT3, to adjust the values of the current flowing through the secondary batteries BAT1 through BAT3.

In the current controller 131A of the present embodiment, the switching element SWa is a MOSFET connected in parallel to the resistor R2, and a gate terminal of the switching element SWa is connected to the charger connection detection terminal T to receive a signal (S1) from the terminal T.

In the frequency controller 132A of the present embodiment, the switching element SWb is a MOSFET connected in parallel to the resistor R4, and a gate terminal of the switching element SWb is connected to the charger connection detection terminal T to receive a signal (S2) from the terminal T.

The charger connection detection terminal T detects in binary whether or not the charger is connected. Herein, it is not necessary to provide a specified terminal as the charger connection detection terminal T; alternately, for example, the charger connection detection terminal T can be implemented by using a thermistor connected to the terminal P+ or the terminal P−.

A battery state control circuit 100A enters the current continuous mode when the terminal T detects that the charger is connected, which can equalize the voltages of the respective secondary batteries BAT1 through BAT3 in a short time, depending on the speed of the battery voltage fluctuations in the secondary batteries BAT1 through BAT3 due to charging.

Further, in a period during which the terminal T does not detect that the charger is connected, the battery state control circuit 100A enters the discontinuous mode, thereby reducing the inductor current $I_{LP}$ flowing to the primary coil LP, and reducing the power consumption for the operation in the battery state control circuit 100A. The relation between the state of the secondary batteries BAT1 through BAT3 and the operation of the battery state control circuit 100A is shown in the following TABLE 1.

TABLE 1

| | CONNECT CHARGER | PRIMARY SIDE INDUCTOR CURRENT $I_{LP}$ | SWITCHING CYCLE $T_{CYC}$ |
|---|---|---|---|
| DURING CHARGING | WITH CONNECTION | LARGE CURRENT | HIGH FREQUENCY |
| DURING DISCHARGING | WITHOUT CONNECTION | SMALL CURRENT | LOW FREQUENCY |

Herein, when the charger connection detection terminal T detects that the charger is connected, both the current controller 131A and the frequency controller 132A may be adjusted, or either the current controller 131A or the frequency controller 132A may be adjusted so that the operational mode of the battery state control circuit 100A and the flyback transformer 300 is set to the continuous mode.

[Third Embodiment]

Figure 4:
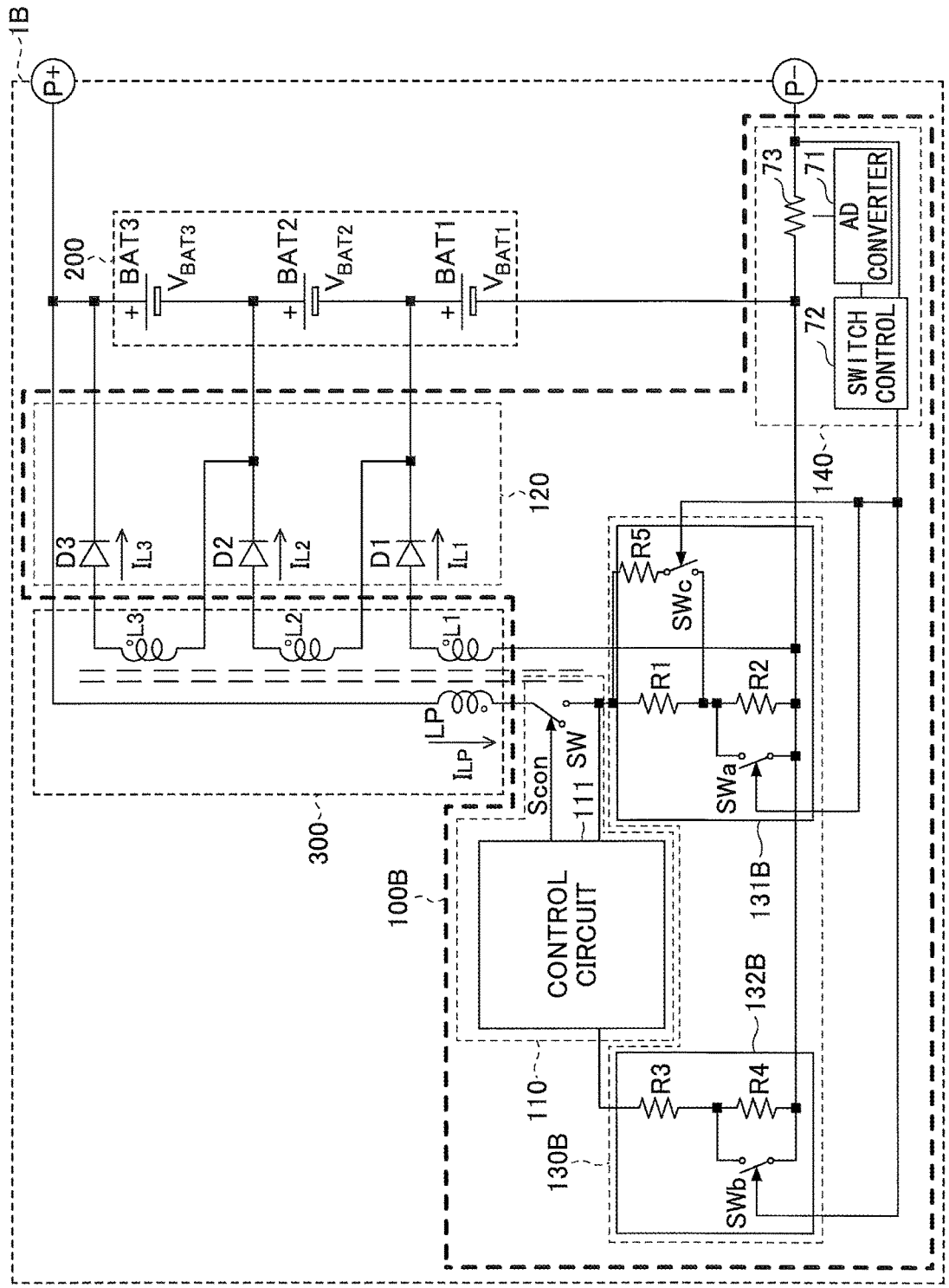
FIG. 4 is a schematic illustrating a battery pack according to a third embodiment.

FIG. 4 shows a schematic of a battery pack 1B of a third embodiment. In the third embodiment, in order to generate signals input to the switching element SWa of a current controller 131B and the switching element SWb of a frequency controller 132B, a current detector 140 is provided, instead of the charger connection detection terminal T of the second embodiment.

In FIG. 4, the current detector 140 includes an AD converter 71, a control switch 72, and a resistor 73. The current controller 131B may further include a resistor R5 and a switch SWc, in addition to the components of the current controller 131 shown in FIG. 1. An output signal from the current detector 140 is input to the switches SWa and SWc of the current controller 131B, thereby enabling the resistance to change in steps.

In the current detector 140, the AD converter 71 detects an analog value of a charge-discharge current of the battery assembly 200, at a connection terminal P−. By detecting the analog value of the charge-discharge current, whether or not the switching control signal is output can be subtly adjusted.

Figures 5A, 5B:
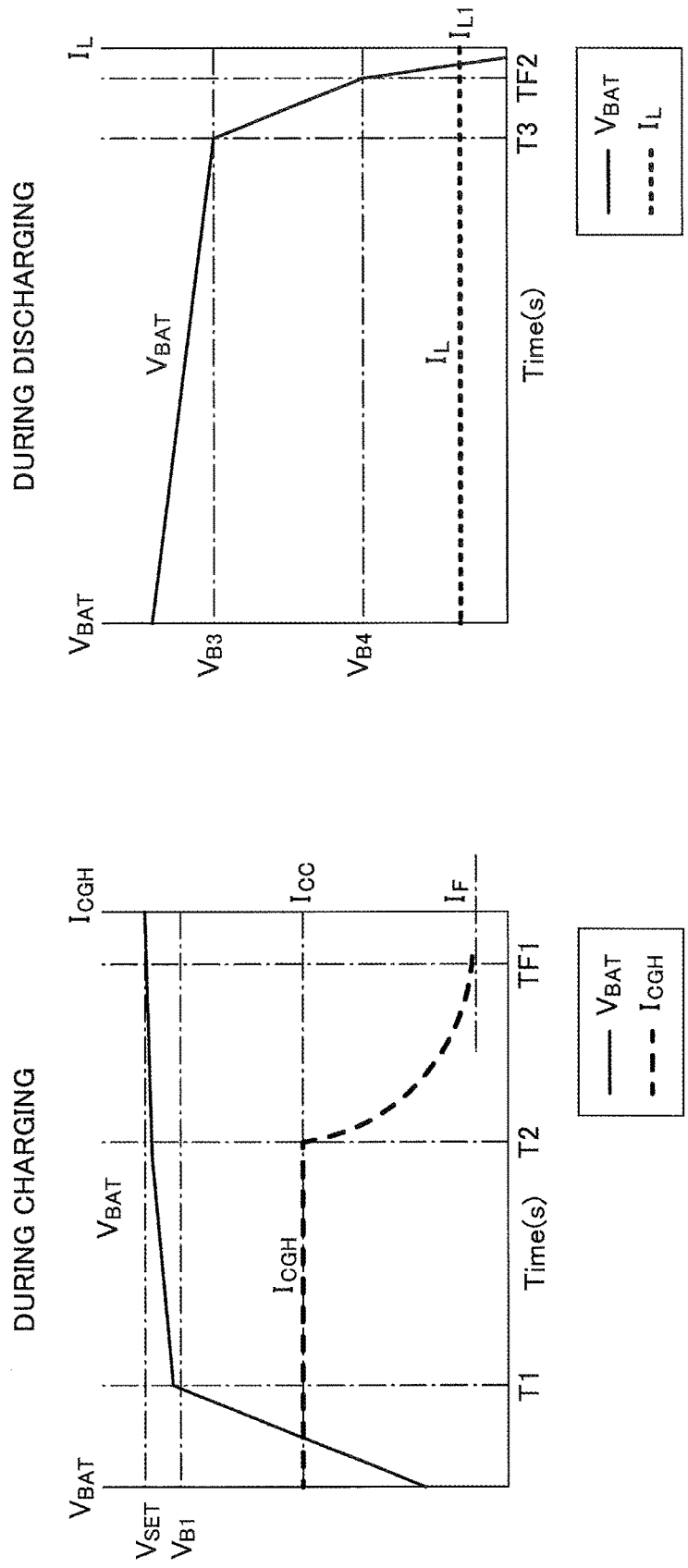
FIG. 5A is a graph showing a voltage change waveform during charging.
FIG. 5B is a graph showing a voltage change waveform during discharging.

FIGS. 5A and 5B are graphs showing voltage changes of the battery pack 1B during charging and discharging. FIG. 5A shows a voltage change in a generally-used battery, such as lithium ion battery during charging, and FIG. 5B shows the voltage change of the battery pack 1B used in FIG. 5A during discharging.

In the charging state shown in FIG. 5A, $V_{BAT}$ denotes a change (charge curve) of the battery voltage of the secondary battery, and $I_{CGH}$ denotes a charging current. In FIG. 5B, $I_L$ indicates a discharge current, and FIG. 5B shows a discharge state in which a constant current load is connected to the battery pack 1B.

In normal charge, the charge curve of the voltage change of FIG. 5A has a voltage change point (charge side voltage change point) $V_{B1}$ at a timing of T1, and then the battery voltage saturates a voltage near an upper limit voltage $V_{SET}$ where the operational mode is switched from a constant current mode to a constant voltage mode.

In FIG. 5A, TF1 indicates a time at which charging is completed. The upper voltage $V_{SET}$ is set in advance depending on the characteristics of the secondary battery. More specifically, when the secondary battery is charged, initially, charging is executed in the constant current mode where the current is kept at a constant value ($Ic_{GH}$), and the voltage is increased toward the upper limit voltage $V_{SET}$ (to time T1), and then the voltage is slowly increased (from time T1 to time T2).

While the charging state enters the constant voltage mode, the voltage is slightly increased and then is nearly kept at the voltage (upper limit voltage) $V_{SET}$.

At time T2 when the voltage has increased to almost the voltage $V_{SET}$, the charge current $I_{CGH}$ starts being decreased. In the constant voltage mode, when the charge current $I_{CGH}$ is decreased to a convergence value $I_F$, or when a predetermined time (e.g., TF1) has elapsed, charging is finished (TF1).

Accordingly, when the charge current is small, for example, when low speed charging is executed where an electronic device has the battery pack 1B installed and several hours are taken, equalization between the respective batteries can be allowed to take a long time.

In this situation, the current value $I_{LP}$ flowing through the flyback transformer 300 is decreased, or/and the OFF period $T_{OFF}$ of the switching of the drive switching element SW is increased so as to decrease the duty ratio. Thus, the battery state of the respective secondary batteries can be equalized in the discontinuous mode. Accordingly, in a state in which power loss is small, charging can be executed efficiently.

By contrast, when the charge current is great, for example, when high speed charging is executed where an electronic device has the battery pack 1B installed and several minutes are taken, a big gap of the battery voltage changes is generated between the secondary batteries due to the large charge current. In this situation, it is necessary to equalize the respective battery voltages in a short time.

Moreover, in a case where charging is executed in shorter time, after the voltage has increased to the upper limit voltage $V_{SET}$ due to the constant current charging (T2), charging is performed using a pulse current. During this period, while the voltage periodically exceeds the upper limit voltage $V_{SET}$ in a short time, the charge current is increased, and the charging speed becomes faster. In this situation, it is further necessary to hurry to equalize the respective battery voltages. In this case, since fast equalization is required, the current value flowing through the flyback transformer 300 and/or the frequency of the pulse signal Scon is increased, and the duty ratio is increased. Thus, the battery state of the respective secondary batteries can be equalized in the continuous mode in a short time.

Alternatively, in the time period from time T2 to time TF1 where the charge current is being decreased in FIG. 5A, the current is rapidly decreased and then the gap of the battery voltage changes generated between the secondary batteries becomes greater. It is preferable that the charge current be changed so as to adjust the battery voltages of the secondary batteries. The relationship between the secondary battery and the operation in a battery state control circuit 100B is shown in the following TABLE 2.

TABLE 2

| DETECT AD CONVERTER | PRIMARY SIDE INDUCTOR CURRENT $I_{LP}$ | SWITCHING CYCLE $T_{CYC}$ |
| --- | --- | --- |
| FAST CHARGE | LARGE CURRENT | HIGH FREQUENCY |
| SLOW CHARGE (-T2) | SMALL CURRENT | LOW FREQUENCY |
| SLOW CHARGE (T2 - TF1) | LARGE CURRENT | HIGH FREQUENCY |
| FAST DISCHARGE (HEAVY LOAD) | LARGE CURRENT | HIGH FREQUENCY |
| SLOW DISCHARGE (-T3) | SMALL CURRENT | LOW FREQUENCY |
| SLOW DISCHARGE (T3 - TF2) | LARGE CURRENT | HIGH FREQUENCY |

With reference to FIG. 5B, the voltage change (discharge curve) has a voltage change point $V_{B3}$ (at Time T3), and the voltage drop becomes precipitous after the battery voltage falls below the voltage change point $V_{B3}$. The further the voltage is decreased, the more voltage may be around an over-discharge voltage $V_{B4}$ where the battery may start deteriorating, and the more likely may a precipitous voltage drop occur. Specifically, during charging, the slope of the charge curve before reaching the voltage change point $V_{B3}$ is gentle, and the ions of electrolyte in the battery are converted into the current.

The voltage change point $V_{B3}$ is, for example, 3.8 V. When the discharge voltage is decreased to the voltage change point $V_{B3}$, there are no ions in the electrolyte of the battery and only a surface capacitor part remains in a body of the battery.

While discharging is executed in a state in which the discharge voltage is lower than the voltage change point $V_{B3}$, the capacitance value of the surface capacitor part is decreased. At this time, the discharge curve in FIG. 5B becomes precipitously decreased, that is, the discharge voltage is rapidly decreased. Namely, the voltage change point $V_{B3}$ is the point at which the degree of voltage drop is changed.

Then, further decreasing the battery voltage causes the capacitance of the surface capacitor part to run out, and the battery voltage is decreased to an over-discharge voltage (for example, battery deterioration voltage) $V_{B4}$, for example, 3.0 V.

After the battery voltage is decreased to the over-discharge voltage $V_{B4}$, discharging the secondary battery causes deterioration in the secondary battery.

Considering the above-described characteristics, when a discharge current is small, that is, when the load connected to the battery pack 1B is light, the respective battery voltages are allowed to be equalized slowly. In this case, by setting the current value flowing through the flyback transformer 300 to be smaller or/and setting the frequency of the pulse signal Scon to be lower, the residual battery voltages of the batteries are equalized in the discontinuous mode, while the duty ratio of the cycle for storing and releasing the energy is set to be a low state. With this control, in a state in which the power loss is small, discharge can be effectively executed.

To the contrary, when the discharge current is great, that is, when the load connected to the battery pack 1B is heavy, the duty ratio needs to be increased. In order to hurry the equalization of the respective battery voltages, it is necessary to raise the duty ratio. In this case, by setting the current flowing through the flyback transformer 300 to be greater, or/and setting the frequency of the pulse signal Scon to be higher, the residual battery voltages of the batteries are equalized in the continuous mode, while the duty ratio of the cycle for storing and releasing the energy is set to be a high state.

In addition, in the middle of discharging, since the rapid voltage drop is started when the battery voltage falls below the voltage change point $V_{B3}$ at the time T3, it is preferable that the battery state control circuit 100 set the duty ratio of the switching to be increased, in the period from the time T3 of the voltage change point $V_{B3}$ to the time TF2 of the over-discharge voltage $V_{B4}$.

In the case where the battery assembly 200 includes multiple secondary batteries, the multiple secondary batteries have the characteristics in which the charge curve of FIG. 5A and the discharge curve of FIG. 5B are superimposed on the multiple (N) steps, so the degree of control of the charge states is ideally determined by monitoring the entirety of the battery-assembly voltage of the battery assembly 200 and the battery voltages of the respective secondary batteries. In this third embodiment, the battery voltages are monitored by detecting the current by the AD converter 71.

Considering the above-described voltages and currents, the AD converter 71 is set to a threshold current responding to the cases of charge and discharge.

The control switch 72, connected to the AD converter 71, is constituted by, for example, a resistor and a switch array. Instead of the control switch 72, an electronic volume device that can finely adjust the value (resistance value) in steps may be provided. In this case, the resistance value may be set so that the resistance value is linearly changed.

As described above, in the present embodiment, when the charge current and the discharge current detected by the AD converter 71 are is large, the operational mode is set to the continuous mode, which can equalize the battery voltages of the respective secondary batteries in a short time, depending on the gap of the battery voltage changes generated between the secondary batteries due to difference of the voltage changing speed.

Herein, a time when the charge current and the discharge current detected by the AD converter 71 is great, means a time when absolute values of the charge current and the discharge current are greater than predetermined values. By contrast, a time when the charge current and the discharge current detected by the AD converter 71 are small means a time when absolute values of the charge current and the discharge current are smaller than predetermined values.

When the charge current and the discharge current detected by the AD converter 71 are small, the operational mode is set to the discontinuous mode, which can reduce the inductor current $I_{LP}$ flowing to the primary coil LP, and reduce power consumption use for operations in the battery state control circuit 100B.

It is to be noted that, depending on the current detection result of the current detector 140 including the AD converter 71, both the resistance values of the current controller 131B and the frequency controller 132B may be operated to be changed; alternatively, either the resistance values of current controller 131B or the frequency controller 132B may be operated to be changed.

[Fourth Embodiment]

Figure 6:
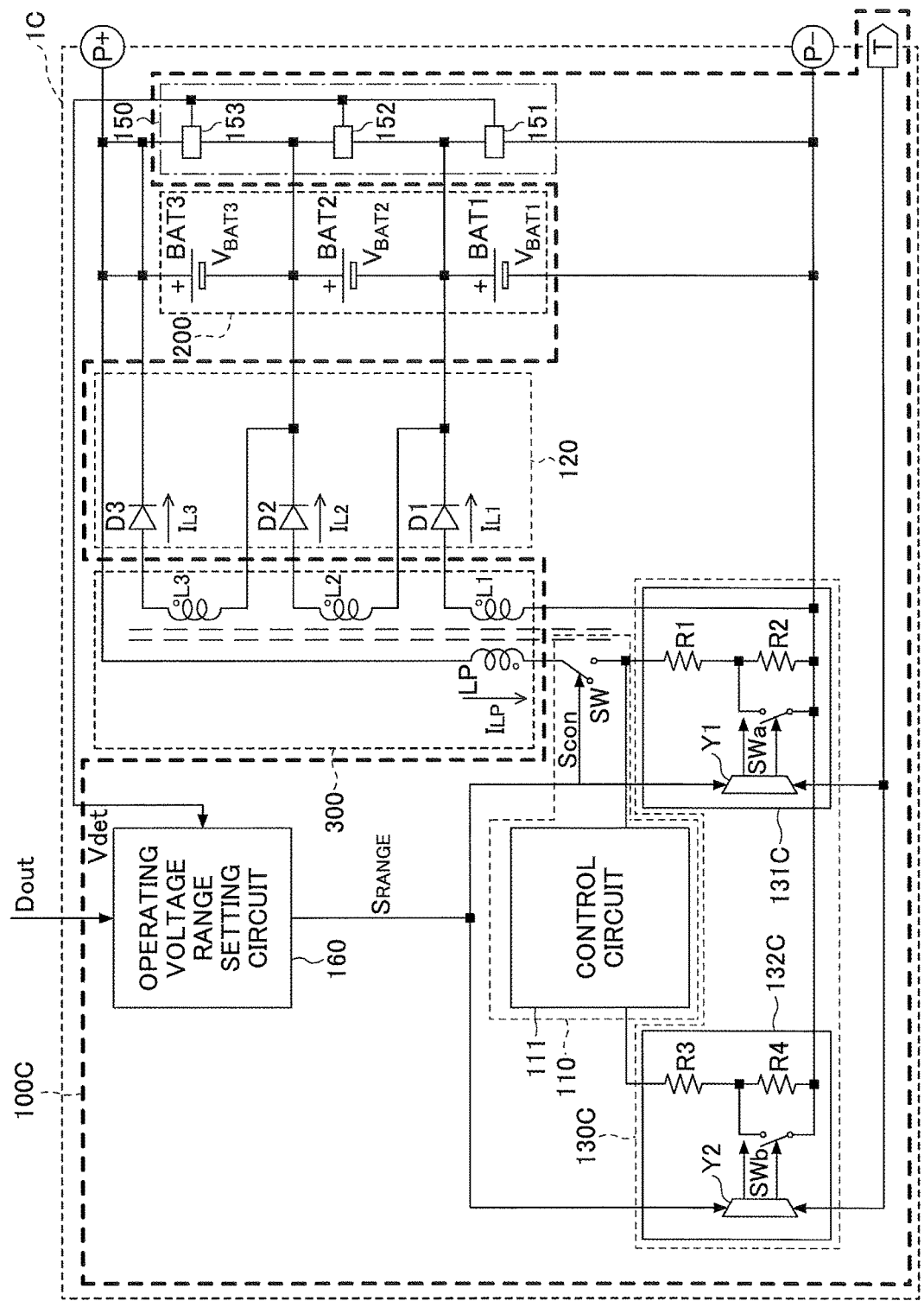
FIG. 6 is a schematic illustrating a battery pack according to a fourth embodiment.

FIG. 6 shows a schematic illustrating a battery pack 1C of a fourth embodiment. The battery pack 1C of the fourth embodiment further includes a battery voltage detection circuit 150 and an operating voltage range setting circuit 160. A current controller 131C includes a selector Y1 connected to the switching element SWa, and a frequency controller 132C includes a selector Y2 connected to the switching element SWb.

<Setting Operating Voltage Range>

The voltage battery detection circuit 150, serving as a battery voltage detector, includes the same number of detectors 151, 152, and 153 as the number of the secondary batteries BAT1, BAT2, and BAT3 of the battery assembly 200. The detectors 151, 152 and 153 are connected in parallel to the secondary batteries BAT1, BAT2, and BAT3 to detect the battery voltages of the respective secondary batteries BAT1, BAT2, and BAT3. In the following description, each of battery voltages of the secondary batteries BAT1, BAT2, and BAT3 is called a battery voltage, while the entirety of battery voltage of the battery assembly 200 having secondary batteries BAT1, BAT2, and BAT3 is called a battery assembly voltage.

In the present embodiment, the battery voltage detection circuit 150 outputs a detection signal (charge voltage detection signal) Vdet indicating a detection result of the battery voltages detected by the respective detectors 151, 152, and 153. When at least one of the battery voltages detected by the respective detectors 151, 152, and 153 is decreased to 3.9 V (first threshold voltage), the detection signal Vdet is turned from a high level (H) to a low level (L).

During discharging, when all of the battery voltages of the three secondary batteries BAT1, BAT2, and BAT3 detected by the respective detectors 151, 152, and 153 are greater than 3.9 V, the battery voltage detection circuit 150 outputs a detection signal Vdet showing a H level indicting no detection state. When any of the battery voltages of the three secondary batteries BAT1, BAT2, BAT3 is decreased to or below 3.9 V, the battery voltage detection circuit 150 outputs a detection signal Vdet showing an L level indicting detection state.

In FIG. 6, the operating voltage range setting circuit 160 (operating voltage range setting unit), is connected to a protection circuit (not shown) that forcefully stops discharging when the voltage is decreased to the over-discharge voltage $V_{B4}$. A discharge state signal Dout indicating a discharge state is externally input to the operating voltage range setting circuit 160.

Herein, the protection circuit detects the discharge state of the batteries and outputs an H level of the discharge state signal Dout (Discharge enable signal) when the battery pack 1C is in the discharge state. Specifically, when any of the battery voltages of the secondary batteries BAT1, BAT2, and BAT3 is decreased to 3.2 V immediately before the voltage is decreased to the over-discharge voltage (battery deterioration point) $V_{B4}$ of 3.0 V, the protection circuit forcefully stops discharging, to turn the discharge state signal Dout to L level. In other words, the protection circuit outputs a H level of the discharge state signal Dout (Discharge enable signal) in a period during which all of the battery voltages of the secondary batteries BAT1, BAT2, and BAT3 are greater than 3.2 V.

Further, the operating voltage range setting circuit 160 outputs control switching H/L of a control signal Srange, based on the detection signal Vdet output from the battery voltage detection circuit 150 and the discharge state signal Dout indicating the detected discharge state.

Figure 7:
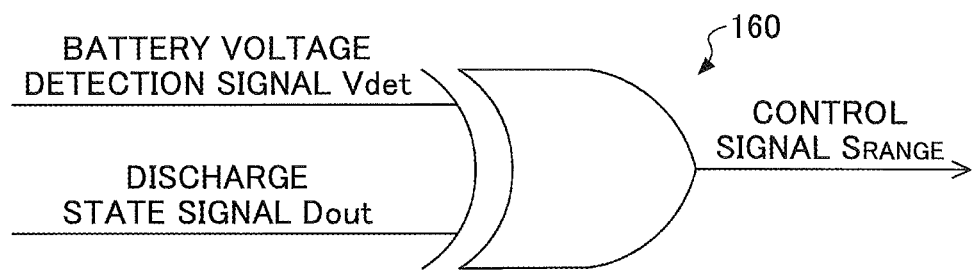
FIG. 7 is a diagram illustrating an operating voltage range setting circuit included in the battery pack shown in FIG. 6.

FIG. 7 shows a constructional diagram illustrating the operating voltage range setting circuit 160. The operating voltage range setting circuit 160 is constituted by, for example, an XOR circuit having two different threshold voltages. In FIG. 7, the control signal Srange output from the XOR circuit 160 is input to the selector Y1 of the current controller 131C and the selector Y2 of the frequency controller 132B. The relationship between the states of the secondary batteries and the operation of a charge state control circuit 100C is expressed in the following TABLE 3.

TABLE 3

| | BATTERY VOLTAGE DETECTION SIGNAL Vdet | DISCHARGE STATE SIGNAL Dout | CONTROL SIGNAL Scon | CONNECT CHARGER | SELECTOR | PRIMARY SIDE INDUCTOR CURRENT $I_{LP}$ | SWITCHING CYCLE $T_{CYC}$ |
|---|---|---|---|---|---|---|---|
| DURING CHARGING | — | — | — | CONNECT | SELECT CONNECTION OF CHARGER | LARGE CURRENT | HIGH FREQUENCY |
| DURING DISCHARGING 3.9 V < $V_{BAT}$ | H | H | L | NOT CONNECT | SELECT CONTROL SIGNAL | SMALL CURRENT | LOW FREQUENCY |

TABLE 3-continued

| BATTERY VOLTAGE DETECTION SIGNAL Vdet | DISCHARGE STATE SIGNAL Dout | CONTROL SIGNAL Scon | CONNECT CHARGER | SELECTOR | PRIMARY SIDE INDUCTOR CURRENT $I_{LP}$ | SWITCHING CYCLE $T_{CYC}$ |
|---|---|---|---|---|---|---|
| DURING DISCHARGING $3.2\ V < V_{BAT} \leq 3.9\ V$ | L | H | H | NOT CONNECT | SELECT CONTROL SIGNAL | LARGE CURRENT | HIGH FREQUENCY |
| DURING DISCHARGING $V_{BAT} \leq 3.2\ V$ | L | L | L | NOT CONNECT | SELECT CONTROL SIGNAL | SMALL CURRENT | LOW FREQUENCY |

When the battery voltage detection signal Vdet is L level and the discharge state signal Dout is H level (discharge enable signal), that is, when all of the secondary batteries BAT1, BAT2, and BAT3 are in the discharge state and the voltage of any of the secondary batteries BAT1, BAT2, and BAT3 is equal to or less than 3.9 V (the voltage is within a range from over 3.2 V to 3.9 V), the XOR circuit (160) outputs the H-level control signal Srange to the selectors Y1 and Y2.

By contrast, when the voltages of all of the secondary batteries BAT1, BAT2, and BAT3 are greater than 3.9 V in the discharge state or the voltage of any of the secondary batteries BAT1, BAT2, and BAT3 is less than 3.2 V, the XOR circuit (160) outputs the L-level control signal Srange to the selectors Y1 and Y2.

It is to be noted that, although the operating voltage range setting circuit 160 is represented by the XOR circuit shown in FIG. 7, if only the voltage range from 3.2 V to 3.9 V can be detected, the operating voltage range setting circuit 160 may be constituted by comparator(s) and switch(es) constituted by such as transistors.

The control signal Srange from the above-configured operating voltage range setting circuit 160 is output to the selector Y1 connected to the switching element SWa in the current controller 131C and the selector Y2 connected to the switching element SWb in the frequency controller 132C.

The selectors Y1 and Y2 are also connected to a charge connection detection terminal T. During charging, the selectors Y1 and Y2 always select the signal from the charge connection terminal T. Similar to the first and second embodiments, during charging, the switching elements SWa and SWb are in ON state, so the resistors R2 and R4 are short circuited. With this control, by reducing the resistance value, the current controller 131C increases the current flowing to the primary coil LP, and the frequency controller 132C sets the frequency of the signal Scon to be higher. Thus, the control circuit 111 increases the duty ratio of switching the drive switching element SW, and the battery state control circuit 100C enters the continuous mode.

The selectors Y1, Y2 select the control signal Srange from the operating voltage range setting circuit 160 during discharge. During discharging, when the control signal is high in a state in which the battery voltage of the secondary batteries is in the discharge state (discharge enable state) and the voltage of any of the secondary batteries is less than 3.9 V, by turning the switching elements SWa and SWb ON, then resistors R2 and R4 are set to be short circuited to decrease the resistance value. In this situation, the current controller 131C increases the current value flowing to the primary coil LP and the frequency controller 132C sets the frequency of the signal Scon to be higher. Thus, the control circuit 111C increases the duty ratio of switching the drive switching element SW, and the battery state control circuit 100C enters the continuous mode.

During discharging, when the control signal is L level in a state in which the battery voltages of the secondary batteries are in the discharge state and the voltage of any of the secondary batteries is greater than 3.9V or lower than 3.2 V, by turning the switching elements SWa and SWb OFF, the resistors R2 and R4 are set not to be short-circuited to increase the resistance value. In this situation, the current controller 131C decreases the current value flowing to the primary coil LP and the frequency controller 132C sets the frequency of the signal Scon to be lower. Thus, the control circuit 111C decreases the duty ratio of the switching of the drive switching element SW, and the battery state control circuit 100C enters the discontinuous mode.

Thus, in the present embodiment, by setting the operational mode to be the current continuous mode when the terminal T detects that the charger is connected, the secondary battery having the lowest voltage can be charged in a short time, in accordance with the speed of the battery voltage fluctuations in the respective secondary batteries BAT1 through BAT3. Therefore, the battery voltages of the secondary batteries can be equalized in a short time.

Furthermore, the operating voltage range setting circuit 160 classifies the cases of the discharges based on the discharge voltage and outputs the H-level control signal Srange in a state in which any of the secondary batteries BAT1, BAT2, and BAT3 is in the discharge enable state with a voltage lower than 3.9 V, which causes the battery state control circuit 100C to enter the current continuous mode. Therefore, the battery voltages of the secondary batteries BAT1 through BAT3 can be equalized in a short time, in accordance with the speed of the battery voltage fluctuations due to charging.

By contrast, the control signal Srange is L level in a state in which any of the secondary batteries BAT1, BAT2, and BAT3 has a voltage greater than 3.9 V or less than 3.2 V, which causes the battery state control circuit 100C to enter the discontinuous mode, and the inductor current $I_{LP}$ flowing to the primary coil LP can be set smaller. Thus, the current consumption for the operation of the battery state control circuit 100C due to the discharge can be reduced.

Herein, when the charger connection detection terminal T detects that the charger is connected, the current controller 131C and/or the frequency controller 132C may be set so that the resistance value is smaller.

[Fifth Embodiment]

Figure 8:
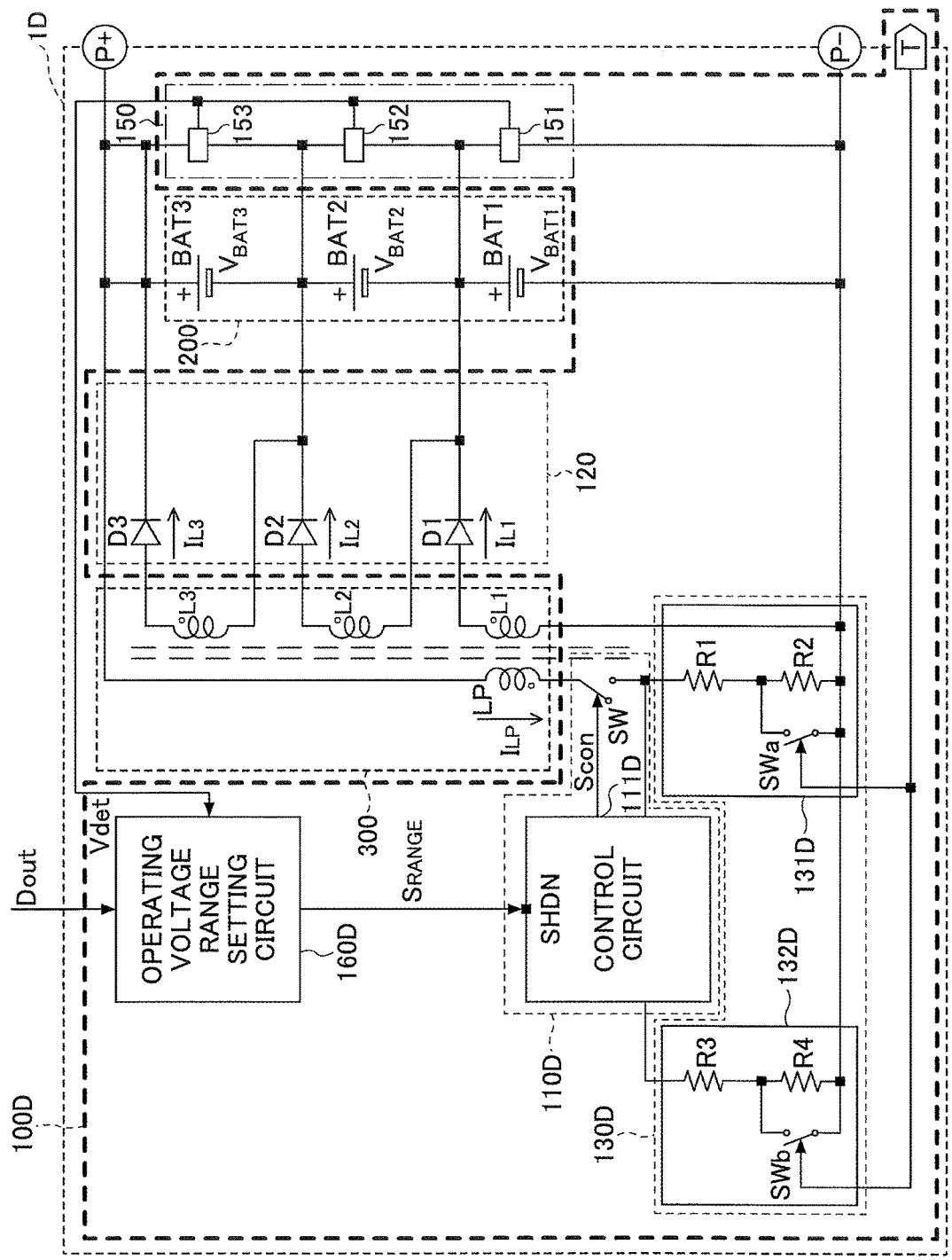
FIG. 8 is a schematic illustrating a battery pack according to a fifth embodiment.

FIG. 8 is a schematic illustrating a battery pack 10 of the fifth embodiment. Similarly to the fourth embodiment, the battery pack 1D includes an operating voltage range setting circuit 160D and a battery voltage detection circuit 150. However, what is different from the fourth embodiment is that, in the fifth embodiment, a signal Srange from the operating voltage range setting circuit 160D is input to a control circuit 111D, instead of the selectors Y1 and Y2.

The configuration and the control of the battery voltage detection circuit 150 are identical to those of the fourth embodiment.

Similarly to the fourth embodiment, the operating voltage range setting circuit (operating voltage range setting unit) 160D is connected to a protection circuit that forcefully stops discharging when the voltage is decreased to the over-discharge voltage $V_{B4}$. A discharge state signal Dout indicating a discharge state (discharge enable state) is externally input to the operating voltage range setting circuit 160D. The operating voltage range setting circuit 160D is constituted by an XOR circuit shown in FIG. 7, but the difference between the embodiments is that an output destination of the control signal Srange is the control circuit 111D in FIG. 8.

The control circuit 111D includes an enable terminal SHDN to which the control signal Srange output from the operating voltage range setting circuit 160D is input. The relation of the state of the secondary batteries and a battery state control circuit 100D is represented in a following TABLE 4.

BAT3 is less than 3.2 V during discharging, the battery state control circuit 100D controls so that balance of the residual battery voltages of the secondary batteries BAT1 through BAT3 is not adjusted.

More specifically, during charging, similarly to the second embodiment, by receiving the charger detection signal indicating that the connection of the charger is detected, the switching element SWa of the current controller 131D and the switching element SWb of the frequency controller 132D are turned ON, to cause the resistors R2 and R4 to be short-circuited to reduce the resistance value. Thus, the current controller 131D increases the value of the current flowing to the primary coil LP and the frequency controller 132D increases the frequency of the pulse signal Scon, thereby setting the operational mode to be the continuous mode where the duty ratio is higher.

Accordingly, the battery state control circuit 100D shown in FIG. 8 enters the current continuous mode when the charger connection detection terminal T detects that the charger is connected, which can equalize the battery volt-

TABLE 4

| | BATTERY VOLTAGE DETECTION SIGNAL Vdet | DISCHARGE STATE SIGNAL Dout | CONTROL SIGNAL Scon | CONNECT CHARGER | CONTROL SIGNAL Scon | PRIMARY SIDE INDUCTOR CURRENT $I_{LP}$ | SWITCHING CYCLE $T_{CYC}$ |
|---|---|---|---|---|---|---|---|
| DURING CHARGING | — | — | — | CONNECT | ON | LARGE CURRENT | HIGH FREQUENCY |
| DURING DISCHARGING 3.9 V < $V_{BAT}$ | H | H | L | NOT CONNECT | OFF | OFF | OFF |
| DURING DISCHARGING 3.2 V < $V_{BAT}$ ≤ 3.9 V | L | H | H | NOT CONNECT | ON | SMALL CURRENT | LOW FREQUENCY |
| DURING DISCHARGING $V_{BAT}$ ≤ 3.2 V | L | L | L | NOT CONNECT | OFF | OFF | OFF |

As shown in TABLE 4, in the present embodiment, while the control signal Srange is in H level, the control circuit 111D is operated. While the control signal Srange is in L level, the control circuit 111D stops operating and stops switching the drive switching element SW.

In the present embodiment, while the control circuit 111D is operated, the control circuit 111D generates and outputs the switching element control signal Scon that turns ON and OFF the drive switching element SW in a predetermined cycle. That is, while the control circuit 111D is operated, the battery state control circuit 100D is activated.

While the operation of the control circuit 111D is stopped, the control circuit 111D stops outputting the switching element control signal Scon and stops the operation of turning the drive switching element SW ON and OFF. That is, while the control circuit 111D stops the operation, the battery state control circuit 100D stops activation.

Alternatively, without stopping the operation the control circuit 111D, the control circuit 111D keeps outputting the L level signal Scon to control the drive switching element SW so that the drive switching element SW is kept in OFF state for the predetermined period. During this time, by keeping the drive switching element SW in OFF state, the energy amount applied to the primary coil LP is adjusted to be zero.

In other words, without connecting the charger, when the voltage of any of the secondary batteries BAT1, BAT2, and BAT3 is greater than 3.9 V during discharging, and when the voltage of any of the secondary batteries BAT1, BAT2, and ages of the respective secondary batteries BAT1 through BAT3 in a short time, depending on the speed of the battery voltage fluctuations.

Herein, when the charger connection detection terminal T detects that the charger is connected, the current controller 131D and/or the frequency controller 132D may be operated in the continuous mode.

On the contrary, during charging, by not receiving the charger detection signal indicating that the connection of the charger is detected similarly to the second embodiment, the switching element SWa of the current controller 131D and the switching element SWb of the frequency controller 132D are turned OFF, to cause the resistors R2 and R4 to be connected to the resistors R1 and R3 respectively to increase the resistance value. Thus, during discharging, when the current flows to the primary coil LP, the operational mode is set to be the discontinuous mode where the duty ratio is lower, by setting small current flowing to the primary coil LP and setting the low switching frequency.

Herein, during discharging, the enable terminal SHDN of the control circuit 111D directly receives the control signal Srange from the battery voltage detection circuit 150. Due to the above-described setting, the control circuit 111D operates in the discontinuous mode, only when the control circuit 111D receives the H-level control signal Srange indicating that the secondary batteries BAT1, BAT2, and BAT3 are in the discharge enable state (voltage>3.2 V) and the voltage of any of the secondary batteries BAT1, BAT2, and BAT3 is equal to or less than 3.9 V.

During discharging, in other case where the voltages of all of the secondary batteries BAT1, BAT2, and BAT3 are greater than 3.9 V or the voltage of any of the secondary batteries BAT1, BAT2, and BAT3 is less than 3.2 V, the control signal Srange is in L state, which forcefully shuts off the operation of the control circuit 111D. Thus, when voltages of all of the secondary batteries BAT1, BAT2, and BAT3 are greater than 3.9 V in the discharge mode or the voltage of any of the secondary batteries BAT1, BAT2, and BAT3 is less than 3.2 V, the control operation in the battery state control circuit 100D is not executed.

<Setting of Operating Voltage Range>

Herein, as described above using the FIG. 5B, when a constant current load is connected, the voltage change has the voltage change point $V_{B3}$ at the time T3, and the battery voltage rapidly drops around the voltage change point $V_{B3}$. As the voltage is further decreased, the capacitance of the surface capacitor part runs out, and the battery voltage is decreased to a battery deterioration point (over-discharge voltage) $V_{B4}$, for example, 3.0 V. The secondary battery deteriorates by further discharging after the battery voltage falls below the battery deterioration point $V_{B4}$.

Accordingly, it is preferable that the discharge of the secondary battery be stopped before the voltage is decreased to the battery deterioration point $VB_4$.

Considering the voltage change, in the fifth embodiment, during discharging, when any of the battery voltages of the three secondary batteries BAT1, BAT2, and BAT3 is decreased to 3.9 V (first threshold voltage) that is immediately before the voltage change point $V_{B3}$, the battery voltages of the three secondary batteries BAT1, BAT2, and BAT3 are controlled to achieve equalization (performing cell balancing adjustment).

Furthermore, when any of the battery voltages of the secondary batteries BAT1, BAT2, and BAT3 is decreased to 3.2 V (second threshold voltage) that is immediately before the over-discharge voltage $V_{B4}$ of 3.0 V, the protection circuit forcefully stops discharging the battery assembly 200 of the battery pack 1D.

As described above, the battery state control circuit 100D is activated in a period from when any of the battery voltages of the secondary batteries BAT1, BAT2, and BAT3 is decreased to 3.9 V that is immediately before the voltage change point $V_{B3}$ of 3.8 V (time T3) to when any of the battery voltages of the secondary batteries BAT1, BAT2, and BAT3 is decreased to 3.2 V that is immediately before the point $V_{B4}$ of 3.0 V (time T4).

In short, in the fifth embodiment, when a gap of the battery voltage changes generated among the secondary batteries is relatively small (when the slope of the discharge curve is relatively gentle), the battery state control circuit 100D is not operated. When the gap of the battery voltage changes generated among the secondary batteries is relatively great (when the slope of the discharge curve is relatively sharp) and the voltage falls below the over-discharge voltage $V_{B4}$, the battery state control circuit 100D is not operated.

In the case where the battery assembly includes multiple secondary batteries, because the multiple secondary batteries have the characteristics in which the charge curve of FIG. 5A and the discharge curve of FIG. 5B are superimposed on the multiple (N) steps, the degree of control of the charge states is ideally determined by monitoring the entire battery, namely, the voltage of the battery assembly and the voltages of the respective secondary batteries. In the fifth embodiment, the battery voltages are monitored by the battery voltage detection circuit 150.

In the present embodiment, a lithium ion battery or a dual carbon battery (DCB) can be used as the secondary batteries.

Herein, if the voltage drop of the battery is too precipitous, the voltage may be decreased to the over-discharge voltage $V_{B4}$ of 3.2 V while the battery voltages are being equalized. Thus, the battery voltage equalization may not be sufficiently effective. Herein, the discharge curve of the DCB until the voltage is decreased to an over discharge point(voltage) $V_{B4}$ is gentler than that of the lithium ion battery, and using the DCB for the secondary batteries is more effective in the present embodiment.

Therefore, in the fifth embodiment, during discharging, the battery state control circuit 100D is operated only in the predetermined operating voltage range within the detected battery voltages of the multiple secondary batteries BAT1, BAT2, and BAT3. Therefore, the power consumption for the operation to equalize the battery voltages of the multiple batteries can be reduced. Thus, the energy can be transferred from the battery having high voltage to the battery having low voltage effectively without being wasted to achieve the equalization.

With this operation, the battery state control circuit 100D is controlled, depending on the various details and cases such as during charging, during discharging and the residual battery voltages of the secondary batteries. In addition, charging and discharging can be performed while the current consumption for the operation of the battery state control circuit 100D is reduced.

Herein, the battery voltage detection circuit 150 and the operating voltage range setting circuit 160D may include the AD converter 71 described in the second embodiment.

[Sixth Embodiment]

Figure 9:
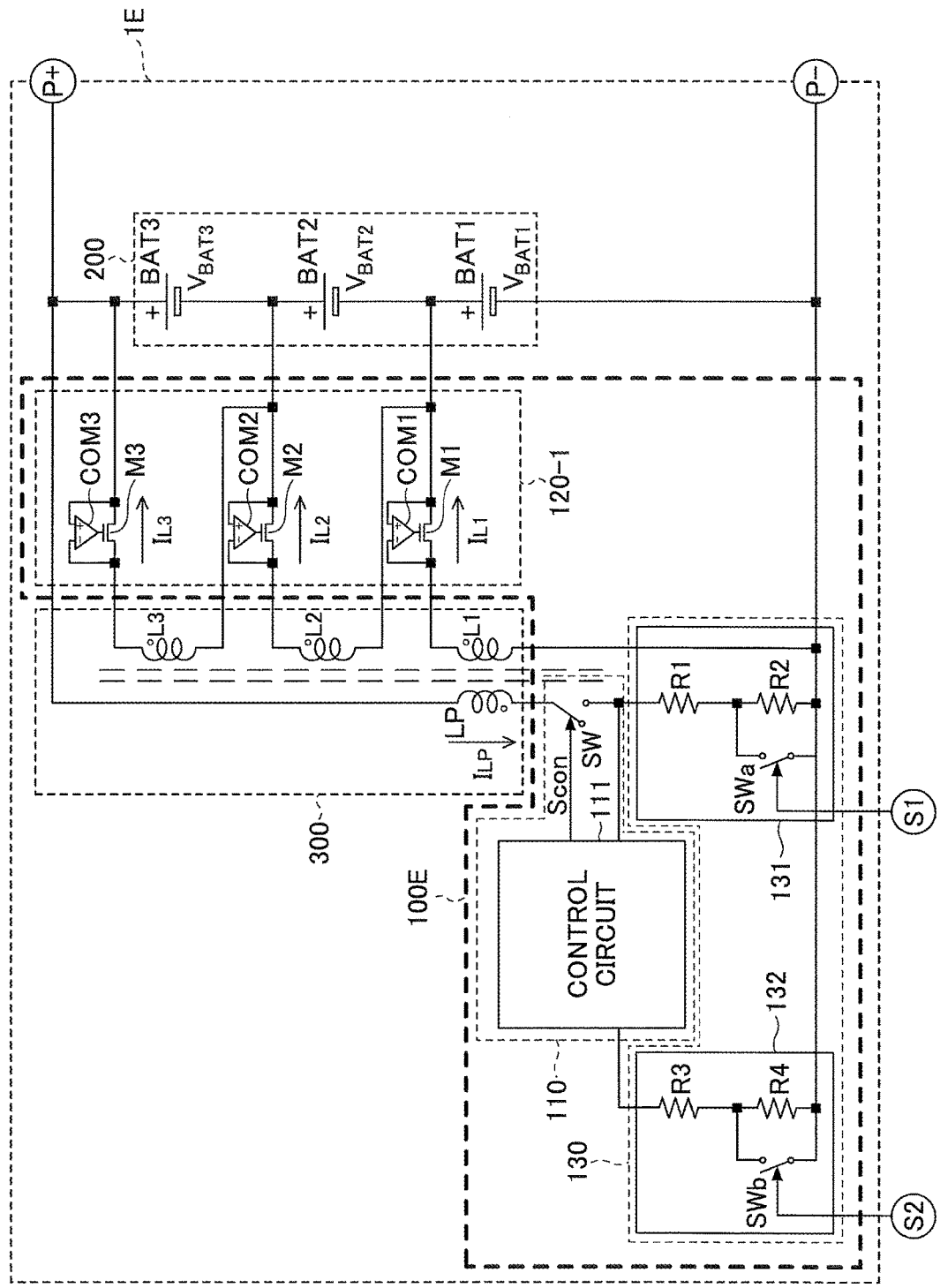
FIG. 9 is a schematic illustrating a battery pack according to a sixth embodiment.

FIG. 9 is a schematic illustrating a battery pack 1E including a battery state control circuit 100E of a sixth embodiment having a variation of the secondary-side distribution/release unit 120.

In a secondary-side distribution/release unit 120-1 of the present embodiment, switches M1, M2, M3 and comparators COM1, COM2, COM3 are provided instead of the diodes D1, D2, D3, as components corresponding to the secondary coils and the secondary batteries.

In the secondary-side distribution/release unit 120-1 of the sixth embodiment, as one example, switches in the secondary-side distribution/release unit 120-1 may be generally constituted by semiconductor switching elements such as FETs. Each of switch groups having the switches and the comparators is operated like an active diode so that a secondary side inductor generating voltage E(V) that is an input-output voltage of the FET is compared with the battery voltage $V_{BATn}(V)$. When the inductor voltage is greater, only the corresponding switch is turned ON.

Alternatively, the switches M1, M2, and M3 may be constituted by synchronous rectification to work inversely to the drive switching element SW of the primary-side driving unit 110 to prevent reverse energy.

As one example, operations in the above-configured battery state control circuit 100E for the battery assembly 200 having three secondary batteries BAT1, BAT2, and BAT3 is described. It is assumed that the battery voltage conditions of the battery assembly 200 hold: the battery voltage $V_{BAT1}$ of the secondary battery BAT1>the battery voltage $V_{BAT2}$ of the secondary battery BAT2>the battery voltage $V_{BAT3}$ of the secondary battery BAT3. In this condition, the operation mode is current discontinuous mode.

In FIG. 9, the primary-side operation of the flyback transformer 300 is similar to the operation of the above-described first embodiment. Compared to the above-described embodiments, by using the power FET having low resistance instead of the diode, the configured circuit has small loss.

Assuming that the ON resistances of the respective FETs (drive switching element SW, switches M1, M2, M3) is identical ($R_{SW}=R_{M1}=R_{M2}=R_{M3}$), the following relation hold for each secondary battery.

$$I_{SW} = \frac{E - V_{BAT}}{R_{SW}} \quad (9)$$

Therefore, if the voltage E is a fixed value, a lot of current $I_{SW}$ (=secondary inductor current $I_{Ln}$ (Noted that, if the value is calculated as a negative value, the value is set to zero)) flows to the battery having low voltage.

Herein, since the battery voltage $V_{BAT3}$ of the secondary battery BAT3 is lowest in the three secondary batteries, a release voltage E of the secondary inductors is clamped at the value $V_{BAT}$ ($E=V_{BAT3}+R_{SW}\times I_{M3}\approx V_{BAT3}$) and is decreased with release of the current.

Herein, since the battery voltages of the batteries BAT1, BAT2, and BAT3 are in decreasing order and the battery voltage $V_{BAT3}$ is equivalent to the counter electromotive force E ($V_{BAT1}>V_{BAT2}>V_{BAT3}=E$), a switching current $I_{Sw}$ is supplied only to the secondary battery BAT3, and only the secondary battery BAT3 is recharged. Herein, assuming that the current $I_{M3}$ is equal to the secondary inductor current $I_3$ based on the above-described formulas (1) and (3), the following formula holds;

$$\frac{1}{2}L_P I_S^2 = \frac{1}{2}L_3 I_{L3P}^2 \quad (10)$$

The formula (10) is equal to the above-described formula (7) when the voltage difference is great. Assuming that ratio of the number of coil turn of the primary coil LP to the secondary coil L3 ($L_1=L_2=L_3$) is set to a ratio of $N_P$ to 1, the peak current value $I_{L3P}$ of the current $I_{L3}$ flowing through the secondary coil L3 is represented by the following formula (11).

$$I_{L3P}=N_P I_S \quad (11)$$

As described above, in this embodiment, the electrical power $W_1$ (=primary inductor current $I_{LP}$) stored in the primary coil LP is supplied to the secondary battery BAT3 via the secondary coil L3 and the switching element M3 as the current $I_{L3}$ with the peak current value $I_{L3P}$, the current $I_{L3}$ being represented by a triangular waveform (see FIGS. 2A and 2B). The secondary battery BAT3 is recharged by the current $I_{L3}$ until the drive switching element SW is turned ON by the control signal Scon output from the control circuit 111. Then, next cycle is entered after a predetermined time set by the control circuit 111 has elapsed.

The process of the energy transfer between the primary side and the secondary side is set to 1 cycle, and the energy is obtained from the entirety of the battery assembly 200 and then is transferred to the battery having the low voltage. By repeating this cycle, without monitoring the respective battery voltages, the battery voltages of the secondary batteries can be equalized.

Compared to the above-described embodiment, in the battery state control circuit 100E of the present embodiment, loss in the diode does not occur, and there is good conversion efficiency. In addition, using a power FET having small ON resistance, and the operation mode is set to the continuous mode shown in FIG. 2B, this configuration is suitable for fast charge and fast discharge in a large-scale and large-power battery system.

Although the above second through fifth embodiments are described based on the first embodiment, the configuration of the sixth embodiment using the comparator and switches instead of the diodes in the secondary side can be applied to the second through fifth embodiments.

[Seventh Embodiment]

In a seventh embodiment, a forward type transformer is used.

Figure 10:
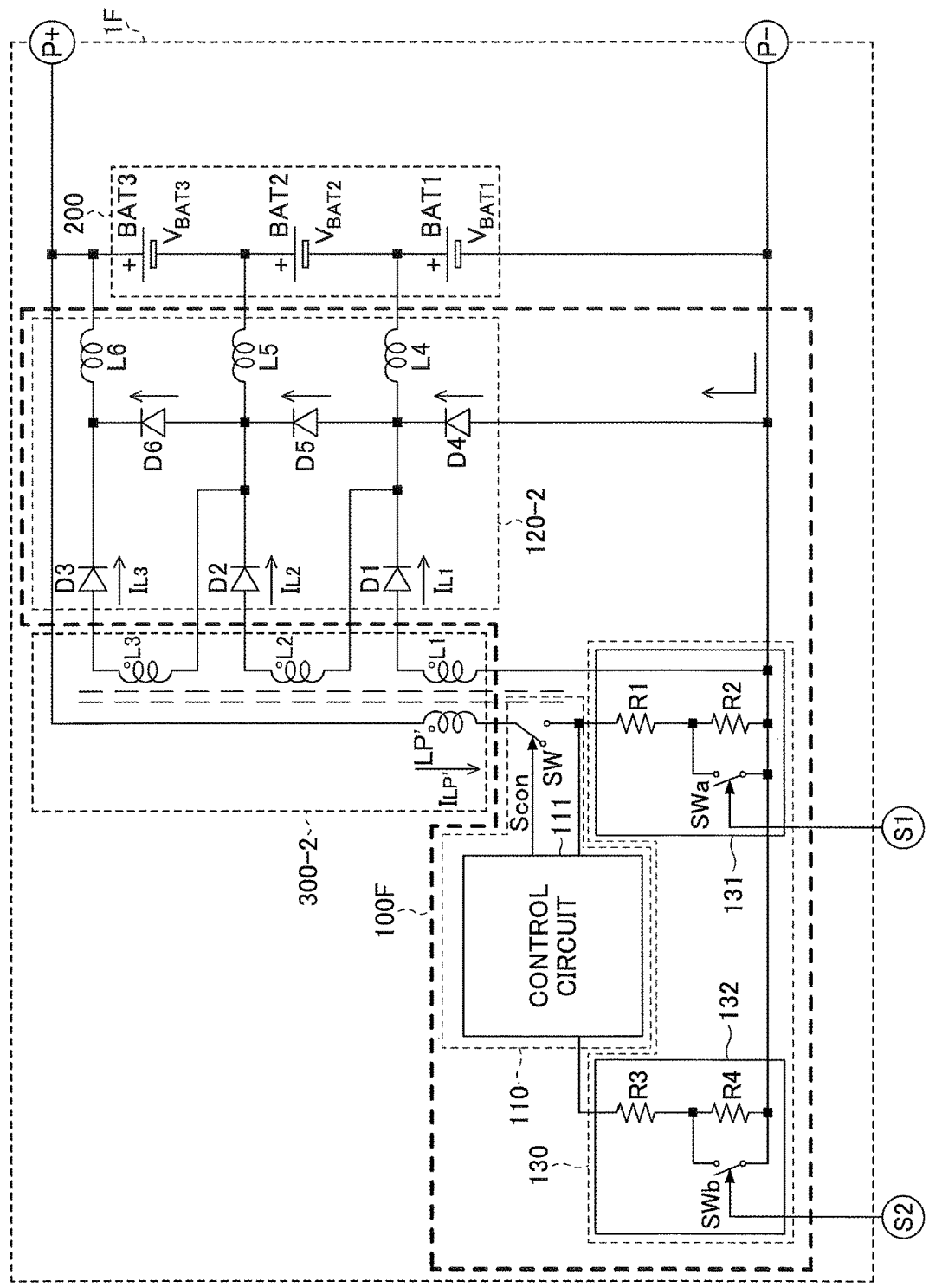
FIG. 10 is a schematic illustrating a battery pack according to a seventh embodiment.

FIG. 10 is a schematic illustrating a battery state control circuit 100F in which a forward converter type transformer is used in a secondary-side distribution/release unit 120-2. In a forward transformer 300-2 of the seventh embodiment, a winding direction of a primary coil LP' is reverse to the primary coil LP of the flyback transformer 300 shown in FIG. 1.

In FIG. 10, when the drive switching element SW is turned ON, a counter electromotive force is generated in the primary coil LP', and an induced electromotive force is generated in the secondary coils L1, L2, L3. Thus, a current flows in any of the secondary batteries BAT1, BAT2, BAT3 via the respective diodes D1, D2 and D3. With this process, the energy is stored in choke coils L4, L5, L6.

When the drive switching element SW is turned OFF, electromotive forces are generated in the choke coils L4, L5, L6 so as to hinder the current changes. Thus, the stored energy is released, so the current returns flowing via commutation diodes D4, D5, D6 that ensure current path.

Herein, when the drive switching element SW is turned on, the energy is transferred to the secondary side in a same time ratio, and the energy is rectified by the diodes D1, D2, D3, D4, D5, D6, and the choke coils L4, L5, L6 to stabilize the current. Thus, a choke input type in which the choke coils are provided immediately after the rectification can be applied to the configuration, the battery state control circuit 100F of the present embodiment is useable in a wide variety of applications.

With this feature, it is preferable that a desired type (flyback or forward) transformer and circuit are selectively applied to a charge state control circuit, depending on a required current amount and voltage amount of a device into which the charge state control circuit is installed.

In the above-described first through seventh embodiments, the energy is obtained from the charger to be connected during charging and from the entirety of the battery assembly 200 during discharging. Then, the obtained energy is transferred to the secondary battery whose battery voltage is lowest via the flyback transformer 300 or the forward transformer 300-2 for charging it, which can constitute an effective system.

As described in the foregoing, the charge state control circuit of the present disclosure can transfer the energy from the battery having high voltage to the battery having low voltage rapidly and efficiently, to ensure a uniform battery voltage for the secondary batteries.

Furthermore, increasing the number of the secondary batteries can be simple and inexpensive to do without requiring an additional circuit and additional monitoring and calculating for the secondary batteries. Therefore, the charge state control of the present disclosure may be useful in the system, not only in a consumer or industrial lithium ion secondary battery pack, but also other types of a system that installs other types of batteries (e.g., DCB), and capacitors.

The battery pack according to the present disclosure is not limited to the above-described embodiments, and variations and modifications may be made without departing from the scope of the present disclosure.

In the foregoing specification, embodiments have been described with reference to numerous specific details. Thus, no limitation, element, property, feature, advantage or attribute that is not expressly recited in a claim should limit the scope of such claim in any way. The specification and drawings are, accordingly, to be regarded in an illustrative rather than a restrictive sense.

The present application is based upon and claims the benefit of priority of Japanese Patent Application No. 2014-026709, filed on Feb. 14, 2014, the content of which is incorporated herein by reference.

What is claimed is:

1. A battery state control circuit for connection to multiple rechargeable batteries, the multiple batteries being connected in series, for connection to a primary coil connected in series to the multiple batteries, and for connection to multiple secondary coils to which electrical energy stored in the primary coil is transferred, the multiple secondary coils being connected in parallel to the multiple batteries, respectively, the battery state control circuit comprising:
an adjustment unit to adjust the energy amount stored in the primary coil, in accordance with a state of at least one of the multiple batteries,
wherein the primary coil repeats a cycle of storing and releasing the energy stored in the primary coil, and
the adjustment unit adjusts a length of a storing period during which the primary coil stores the energy, relative to the cycle, in accordance with the state of said at least one of the multiple batteries.

2. The battery state control circuit as claimed in claim 1, wherein the adjustment unit adjusts a length of the cycle relative to the storing period during which the primary coil stores the energy, in accordance with the state of the batteries.

3. The battery state control circuit as claimed in claim 1, further comprising:
a terminal to receive an input of a charger connection signal indicating that a charger to charge the multiple batteries is connected;
wherein the adjustment unit adjusts the energy amount, in accordance with the charger connection signal, the charger connection signal serving to indicate the state of the batteries.

4. The battery state control circuit as claimed in claim 3, wherein the adjustment unit sets the energy amount to be greater when the charger connection signal is input to the terminal, than when the charger connection signal is not input.

5. The battery state control circuit as claimed in claim 1, further comprising:
a voltage detection circuit to detect respective voltages of the batteries;
wherein the adjustment unit adjusts the energy amount, in accordance with the detected voltages, the detected voltages serving to indicate the state of the batteries.

6. The battery state control circuit as claimed in claim 1, further comprising:
a connection terminal connectable to a load or a charger; and
an AD converter to detect a value of a current flowing between the batteries and the connection terminal;
wherein the adjustment unit adjusts the energy amount, in accordance with the current value detected by the AD converter, the current value serving to indicate the state of the batteries.

7. The battery state control circuit as claimed in claim 6, wherein the adjustment unit increases the energy amount when an absolute value of the current value detected by the AD converter is greater than a predetermined threshold current.

8. The battery state control circuit as claimed in claim 1, further comprising:
a drive switching element connected in series to the primary coil; and
a control unit to control switching ON/OFF of the drive switching element.

9. The battery state control circuit as claimed in claim 8, wherein the adjustment unit includes a current adjustment circuit having multiple resistors connectable to the primary coil via the drive switching element, and
wherein the current adjustment circuit changes connection of the multiple resistors to adjust a threshold current for switching ON/OFF of the drive switching element, for adjusting the length of the storing period during which the primary coil stores the energy, relative to the cycle.

10. The battery state control circuit as claimed in claim 8, wherein the adjustment unit includes a frequency adjustment circuit having multiple resistors connectable to the control unit, and
wherein the frequency adjustment circuit changes the connection of the resistors to adjust a switching frequency to define an ON/OFF cycle of switching of the drive switching element, for adjusting a length of the cycle relative to the storing period during which the primary coil stores the energy.

11. A battery state control circuit for connection to multiple rechargeable batteries, the
multiple batteries being connected in series, for connection to a primary coil connected in series to the multiple batteries, and for connection to multiple secondary coils to which electrical energy stored in the primary coil is transferred, the multiple secondary coils being connected in parallel to the multiple batteries, respectively, the battery state control circuit comprising:
an adjustment unit to adjust the energy amount stored in the primary coil, in accordance with a state of at least one of the multiple batteries;
a drive switching element connected in series to the primary coil; and
a control unit to control switching ON/OFF of the drive switching element,
wherein the control unit keeps the drive switching element in an off state, so that the
adjustment unit sets the energy amount to be zero, and
wherein the primary coil repeats a cycle of storing and releasing the energy stored in the primary coil, and the adjustment unit adjusts a length of a storing period during which the primary coil stores the energy, relative to the cycle, in accordance with the state of said at least one of the multiple batteries.

12. A battery pack comprising:
a battery assembly having multiple rechargeable batteries, the multiple batteries being connected in series;
a transformer, connected to the battery assembly, the transformer including
a primary coil connected in series to the multiple batteries; and multiple secondary coils to which electrical energy stored in the primary coil is transferred, the multiple secondary coils being connected in parallel to the multiple batteries, respectively, and a battery state control circuit for connection to the multiple batteries, the primary coil, and the multiple secondary coils, the battery state control circuit including an adjustment unit to adjust the energy amount stored in the primary coil, in accordance with a state of at least one of the multiple batteries, wherein the primary coil repeats a cycle of storing and releasing the energy stored in the primary coil, and wherein the adjustment unit adjusts a length of a storing period during which the primary coil stores the energy, relative to the cycle, in accordance with the state of said at least one of the multiple batteries.

* * * * *